US008350856B1

(12) United States Patent
Nazir et al.

(10) Patent No.: US 8,350,856 B1
(45) Date of Patent: Jan. 8, 2013

(54) VISUALIZATION OF TIME-VARIANT DATA

(75) Inventors: Atish Nazir, London (GB); James Mulholland, London (GB)

(73) Assignee: Adobe Systems Incorporated, San Jose, CA (US)

( * ) Notice: Subject to any disclaimer, the term of this patent is extended or adjusted under 35 U.S.C. 154(b) by 801 days.

(21) Appl. No.: 12/421,516

(22) Filed: Apr. 9, 2009

Related U.S. Application Data

(60) Provisional application No. 61/044,397, filed on Apr. 11, 2008.

(51) Int. Cl.
*G06T 11/20* (2006.01)
*G06Q 10/00* (2006.01)
*G06Q 30/00* (2012.01)

(52) U.S. Cl. ........................................ 345/440; 705/7.29
(58) Field of Classification Search .................. 345/440, 345/440.2; 705/7.29, 7.31
See application file for complete search history.

(56) References Cited

U.S. PATENT DOCUMENTS

| 7,015,912 | B2 * | 3/2006 | Marais ........................ 345/440.2 |
| 7,027,051 | B2 * | 4/2006 | Alford et al. ................... 345/440 |
| 7,268,782 | B2 * | 9/2007 | Ebert ............................ 345/440 |
| 7,408,554 | B2 * | 8/2008 | Lawson et al. ................. 345/442 |
| 7,882,001 | B2 * | 2/2011 | Nahum ........................... 705/35 |
| 8,094,154 | B1 * | 1/2012 | Silberg et al. ................. 345/440 |
| 2003/0006988 | A1 * | 1/2003 | Alford et al. .................. 345/440 |

* cited by examiner

*Primary Examiner* — Ryan R Yang
(74) *Attorney, Agent, or Firm* — Schwegman, Lundberg & Woessner, P.A.

(57) ABSTRACT

A method to display time-variant information that includes displaying, for example, on a computer-generated user interface, a common baseline value indication (or representation) for multiple data items. The common baseline value indication represents respective baseline values for each of the multiple data items (e.g., stocks) at a first instance in time. The method includes displaying deviation indicators (or representations), relative to the common baseline value indication, for each of the multiple data items. The multiple deviation indicators represent respective deviation values, relative to respective base values, for each of the multiple data items at a second time instance. Each of the deviation indicators may further visually identify a respective deviation value as being positive or negative, relative to a related base value.

28 Claims, 22 Drawing Sheets

US 8,350,856 B1

VISUALIZATION OF TIME-VARIANT DATA

CLAIM OF PRIORITY

The present patent application claims the priority benefit of the filing date of U.S. provisional application No. 61/044,397 filed Apr. 11, 2008, the entire content of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Adobe Systems Inc., All Rights Reserved.

TECHNICAL FIELD

Example embodiments relate generally to the technical field of data processing, and, more specifically, to the presentation of data.

BACKGROUND

The display of data in a meaningful and easily interpretable way to users presents a number of technical challenges, particularly to interface designers. The Information Age is making increasing demands on users quickly to receive, process, interpret and act on ever more volumes of data, both in the performance of job functions and other day to day activities. In particular, the presentation of complex information in a manner that is readily discernible and easily interpretable presents technical challenges to interface designers.

Another challenge facing interface designers is the increased adoption of mobile computing devices, such as mobile telephones and Personal Digital Assistants (PDAs). Such mobile devices typically have small screens and are used in a wide variety of lighting conditions. Usage patterns for such mobile devices may differ greatly from the desktop experience. Further, users of mobile computing devices tend to be task-oriented and may have less time to view and interpret data. Considering, for example, traditional financial data visualizations, such visualizations tend to be large scale and require significant time on the part of users to interpret the data, and draw conclusions therefrom.

BRIEF DESCRIPTION OF DRAWINGS

Some embodiments are illustrated by way of example and not limitation in the figures of the accompanying drawings in which.

DETAILED DESCRIPTION

Figure 1:
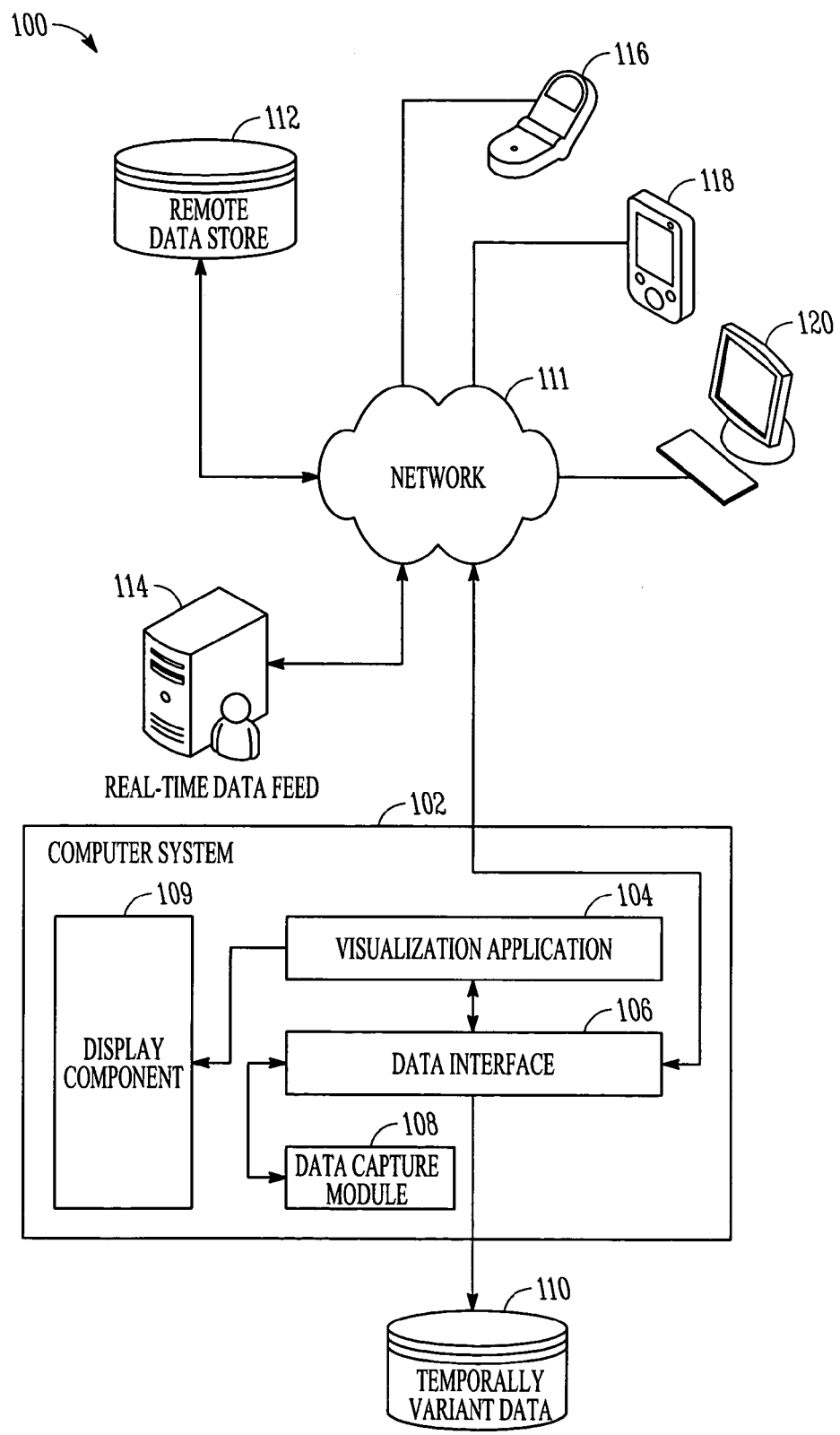
FIG. 1 is a block diagram of a system, according to an example embodiment, to display time-variant information.

In the following description, for purposes of explanation, numerous specific details are set forth in order to provide a thorough understanding of some example embodiments. It will be evident, however, to one skilled in the art that various embodiments may be practiced without these specific details.

Example embodiments provide methods and systems to generate, render and/or display a user interface that presents time-variant information. The example methods and systems seek to present the time-variant information in a manner that seeks to increase understanding of information at a glance, and may use color hinting, radial deviation and area usage to these ends. Example embodiments may, for example, seek to address shortfalls in the mobile data consumption experience by rendering data in a space-efficient manner, using color and by conveying key points of information (e.g., financial information) to a user within constrained area size and radial dimensions.

According to an example embodiment, there is provided a method to display time-variant information that includes displaying, for example, on a computer-generated user interface, a common baseline value indication (or representation) for multiple data items. The common baseline value indication represents respective baseline values for each of the multiple data items (e.g., stocks) at a first instance in time. The method includes displaying deviation indicators (or representations), relative to the common baseline value indication, for each of the multiple data items. The multiple deviation indicators represent respective deviation values, relative to respective base values, for each of the multiple data items at a second time instance. Each of the deviation indicators may further visually identify a respective deviation value as being positive or negative, relative to a related base value.

In one embodiment, the baseline value indication and the deviation indicators are displayed within the context of a segmented graph. Each deviation indicator may be displayed within a dedicated segment of the segmented graph, and the common baseline value indication may be displayed as a baseline reference within each of the segments of the segmented graph.

The sizing of the segments of the segmented graph may be varied according to respective quantity values for data items attributed to these various segments. For example, where a first segment of the segmented graph is dedicated to a particular stock, as an example of a data item, the sizing of segment may be proportional to a number of stock holdings (within a portfolio) for that particular stock.

Within a particular segment of a segmented graph, multiple deviation indicators may be displayed for a particular data item. Each of the deviation indicators may represent a respective deviation value, relative to a particular base value, at a different determinable time or over a different and determinable time interval. For example, where a segment is dedicated to a particular stock, each of the multiple deviation indicators may represent a percentage increase or decrease in the stock for each of multiple days, weeks, and months, relative to a base value, for such a period of time.

In one example embodiment, the segmented graph may be a bar graph. In another example embodiment, the segmented graph may be a polar area graph. In the example embodiment in which the segmented graph is a polar area graph, a number of radial extending dividers may define the segments of the graph, each of the segments being dedicated to a specific data item (e.g., a stock). As noted above, the sizes of the segments may be varied according to a quantity of data items (e.g., a quantity of stock) held in a particular portfolio. The common baseline value indication may be displayed as a baseline circle defined at a radius from a center point of the polar area graph, the baseline circle accordingly extending across each of the segments of the polar area graph.

The displaying of the deviation indicators may include displaying respective indicium or markers (e.g., a circle segment) within each of the graph segments at respective distances (e.g., a radius) from the center point of the polar area graph. The radii of the circle segments displayed may be calculated based on respective deviation values.

The deviation indicators may, in this embodiment, comprise a visual characterization of an area of a dedicated segment (e.g., a coloring of the area of the segment) of a graph. The display of the deviation indicators within the context of a polar area graph may also include visually characterizing (e.g., coloring or otherwise visually distinguishing) a segment area of the polar graph dedicated to a particular data item between the baseline circle and a circle segment of a particular graph segment. The visual characterization indicates an associated deviation value as being either positive or negative relative to a base value.

In various embodiments, the visual identification (or representation) of a deviation value being at least a positive or negative may include displaying a deviation indicator as extending in either a first direction or a second direction from the common baseline value indication.

Example embodiments may also include scaling the display of a segmented graph, as well as deviation indicators displayed within the context of the segmented graph, relative to the common baseline value indication. This scaling may be based upon a determined maximum peak-to-peak deviation between deviation values for multiple data items (e.g., stocks).

In one example embodiment, deviation values may be subject to determination as to whether they transgress a predetermined threshold (e.g., constitute "Black Swan" deviations), and may be selectively excluded from a determination of the maximum peak-to-peak deviation. Further, if a particular deviation value is found to transgress a predetermined threshold, a dedicated and specific transgression indicator may be displayed instead of displaying a deviation indication. In an example embodiment, the deviation values represented by the deviation indications may be percentile deviations relative to respective base values for each of the multiple data items.

FIG. 1 is a block diagram illustrating a system 100, according to an example embodiment, used to display time-variant information. The system 100 includes a computer system 102 (e.g., a mobile telephone, PDA, desktop computer, or sever computer) that hosts a visualization application 104, a data interface 106, and a data capture module 108. The visualization application 104, as will be described in further detail herein, is responsible for the generation and rendering of a user interface to be displayed by a display component 109 (e.g., a Liquid Crystal Display (LCD) or Organic Light-Emitting Diode (OLED) screen) that displays time-variant information. The data interface 106 operates to provide time-variant data to the visualization application 104 from, for example, a local data store 110 (e.g., memory associated with the computer system 102). The data interface 106 may also interface the computer system 102 with remote data sources via a network 111 (e.g., the Internet, a Wide Area Network (WAN), a mobile telephone or other wireless network (e.g., an 802.11 network)). Such remote data sources may include, for example, a remote data store 112 or a source of a real time data feed 114 (e.g., stock price information).

The data capture module 108, together with the visualization application 104 and the data store 110, is communicatively coupled to the data interface 106, and may receive data (e.g., real time data) from the data interface 106 and process such real time data to generate and write time-variant data to the data store 110. For example, the data capture module 108 may capture periodic stock price values for a portfolio of stocks and store such information as time-variant data within the data store 110.

While the display component 109 is shown in FIG. 1 to comprise part of the computer system 102, it will be appreciated that, in other embodiments, the visualization application 104 may generate or render user interfaces (e.g., markup language documents such as Hypertext Markup Language (HTML) pages). The user interfaces may be communicated, via the data interface 106 and network 110, to a remote device such as a mobile telephone 116, a PDA 118 or a remote computer system 120 for display.

Figure 2:
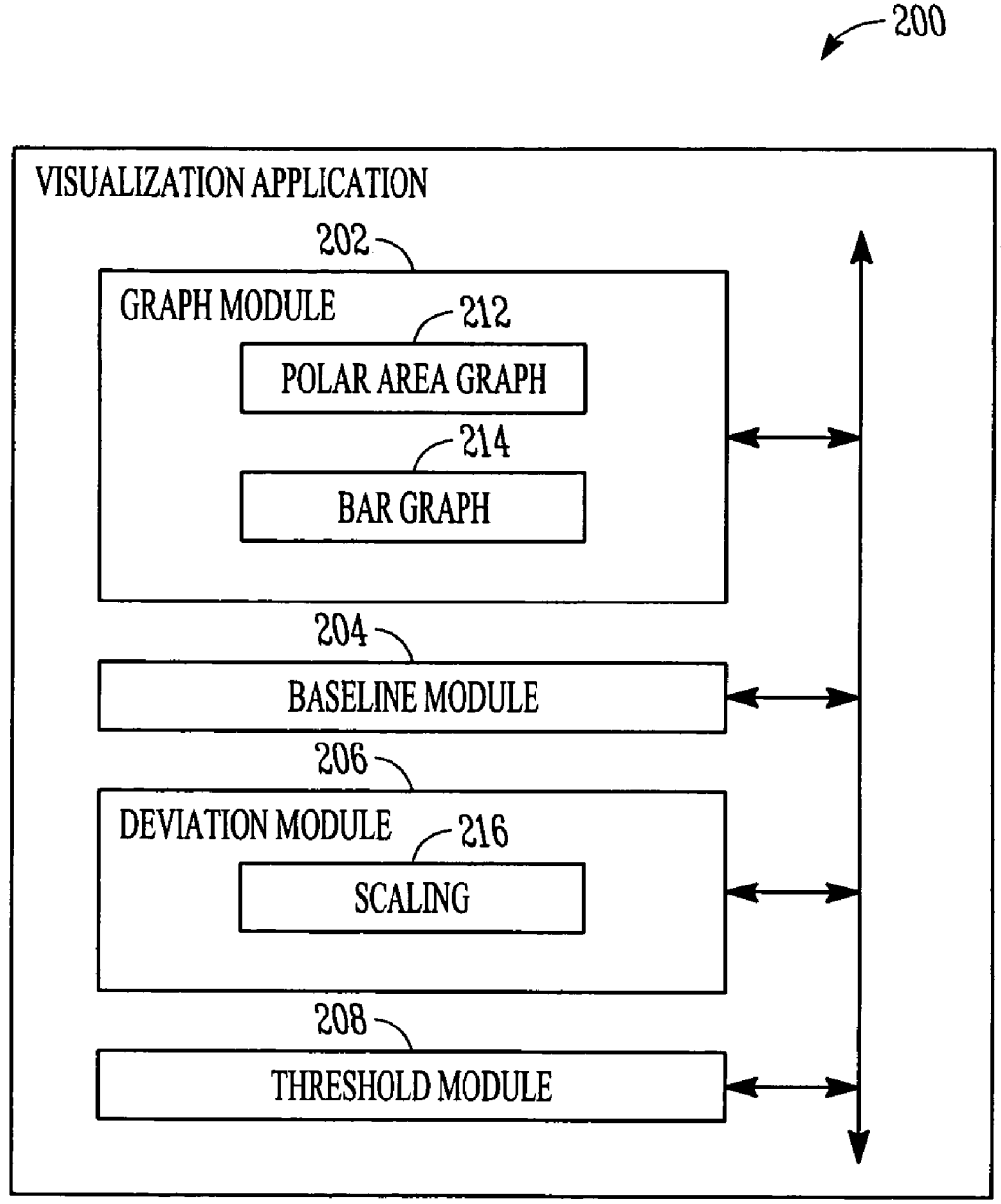
FIG. 2 is a block diagram of a visualization application, according to an example embodiment, to display time-variant information.

FIG. 2 is a block diagram illustrating further architectural details of a visualization application 200, according to an example embodiment. The visualization application 200 may correspond to the visualization application 104 shown in FIG. 1.

The visualization application 200 includes a graph module 202, a baseline module 204, a deviation module 206 and a threshold module 208, all of which may be communicatively coupled. The graph module 202, as will be described in further detail herein, is operative to generate (e.g., render) a display of a graph structure (e.g., a segmented graph), including axes and value data for such a graph structure. The graph module 202 may include the ability to generate and display polar area graphs 212 and bar graphs 214, in addition to numerous other types of graphs that are well-known in the art.

The baseline module 204 is responsible for the generation (e.g., rendering) of a common baseline value indication or representation for multiple data items within the context of a graph generated by the graph module 202. Similarly, the deviation module 206 is responsible for displaying deviation indications or representations for each of multiple data items, with these deviation indications being displayed relative to a baseline value indication. The deviation module 206 includes scaling functionality 216 in order to scale deviation indications within the context of a graph generated by the graph module 202. The graph module 202 may similarly include scaling functionality (not shown) in order to the scale the generation of a graph structure to be displayed.

The threshold module 208 operates in conjunction with the deviation module 206 to determine whether a deviation value exceeds a determinable threshold (e.g., constitutes a "Black Swan" event). The threshold module 208 may accordingly operate to generate and cause display of a transgression indicator, within a segment of a graph, in place of a deviation indication generated by the deviation module 206. The threshold module 208 then also operate with the scaling functionality 216 of the deviation module 206 and the graph module 202 in order to selectively exclude deviation values from a scaling operation (e.g., that includes determining maximum peak-to-peak deviations) that is performed by the scaling functionality 216.

Figure 3:
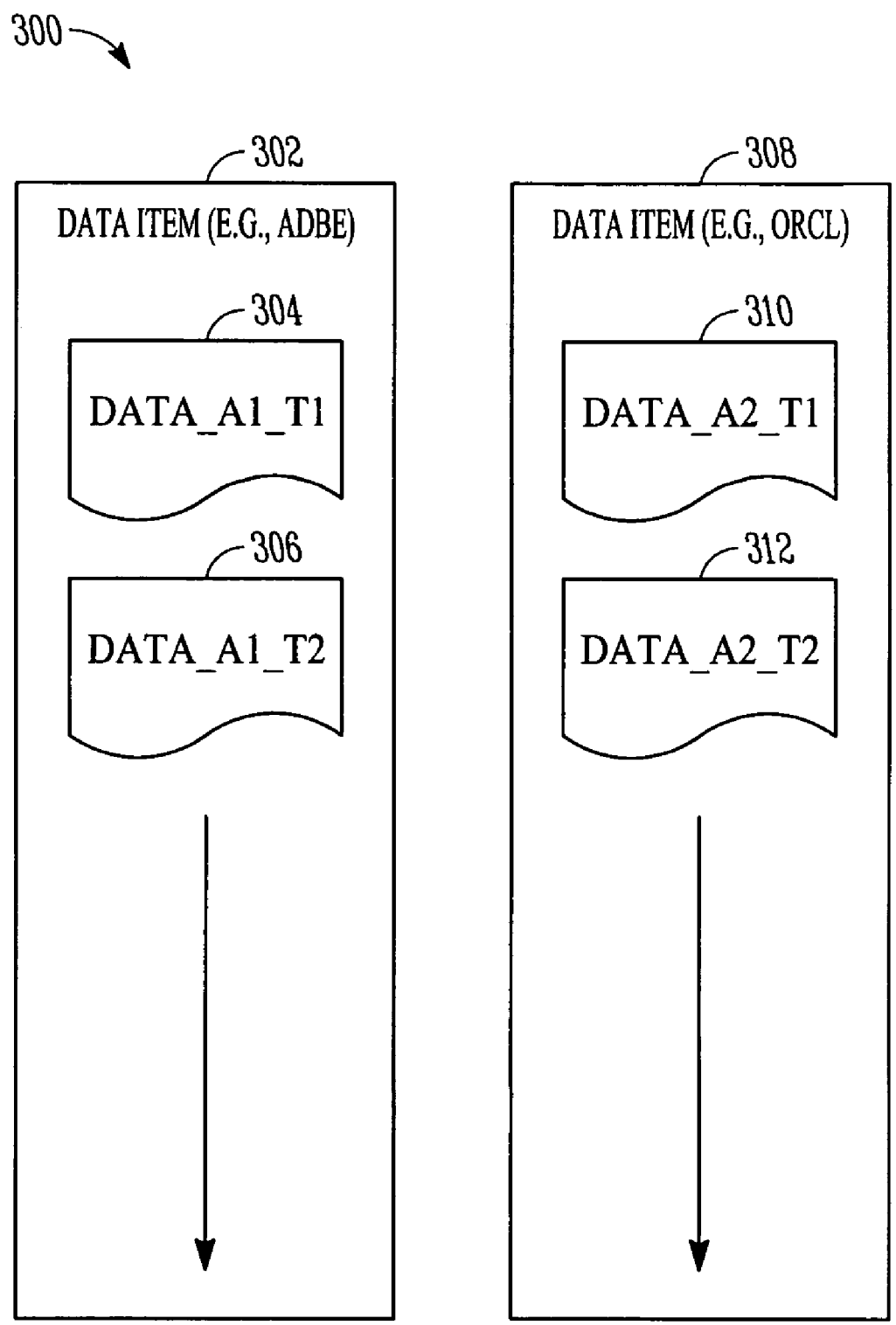
FIG. 3 is a data diagram illustrating multiple instances of time-variant data, according to an example embodiment, for multiple data items (e.g., for particular stocks)

FIG. 3 is data diagram illustrating time-variant data 300, according to an example embodiment. The time-variant data 300 includes data from multiple points in time for a particular data item 302 (e.g., stock prices for ADBE stock at various instances in time). A first data value 304, captured at a first time instance, and second data value 306, captured at a second time instance, are related to the data item 302 and may be stored within a data structure (e.g., a relational database table) within the data store 110. Similarly, data values 310 and 312, captured at first and second time instances, respectively, and associated with a second data item 308, may also be stored within the data store 110. The data values 304, 306, 310 and 312 may, as described above, be captured and processed by the data capture module 108 from information received via the data interface 106.

The visualization application 104 may use the various data values to derive and display comparative data information. For example, the visualization application 104 may use data values 304 and 306 to generate comparative (e.g., deviation) data particular to the first data item 302. Further, the visualization application 104 may also derive comparative information relevant to the comparison of the data item 302 and the data item 308 from combinations of the data items 304, 306, 310, 312.

Figure 4:
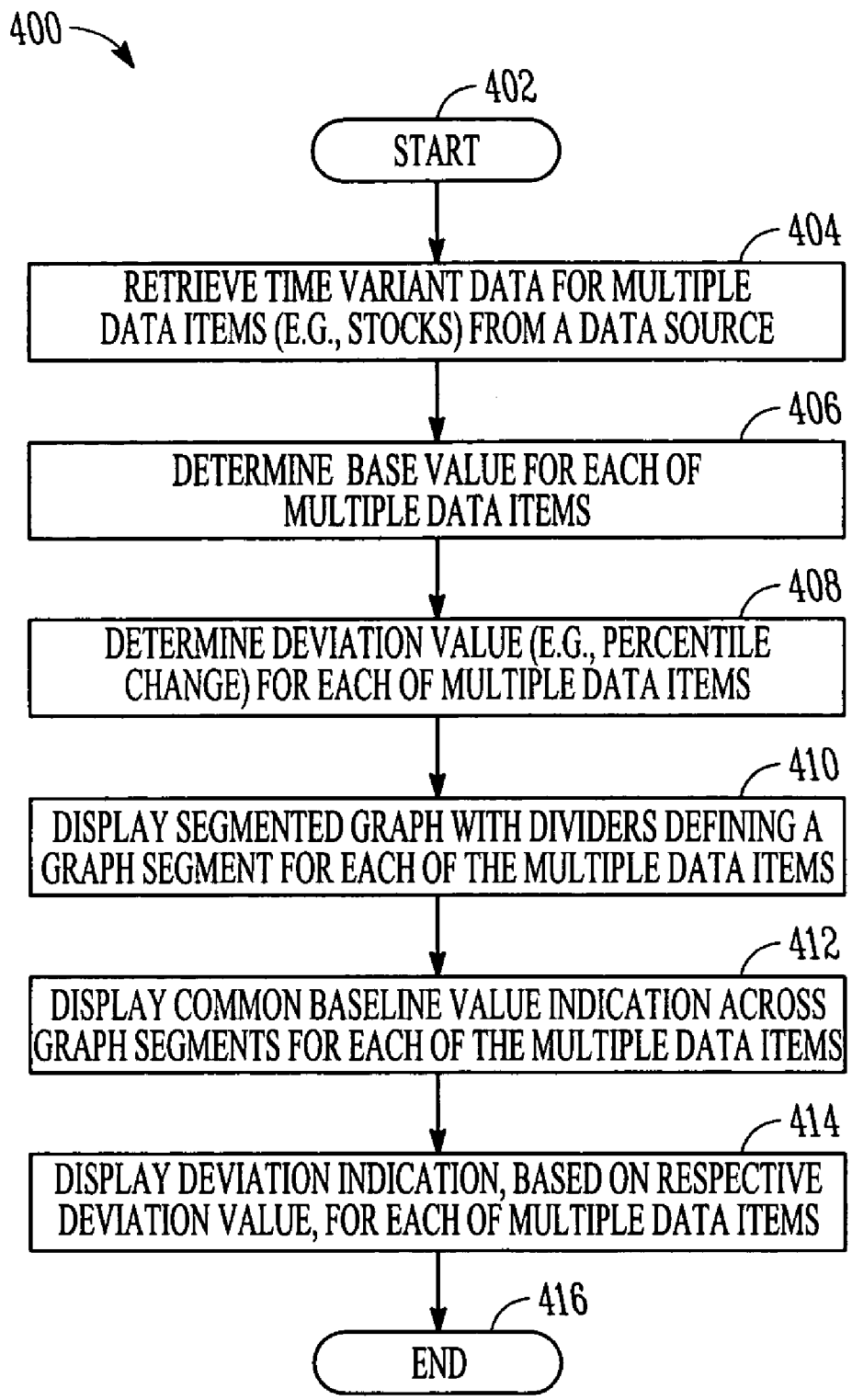
FIG. 4 is a flowchart illustrating a method, according to an example embodiment, to display time-variant information.

FIG. 4 is a flowchart illustrating a method 400, according to an example embodiment, to generate a display of time-variant information. While specific operations of the method 400 are described below as being performed by specific components, modules or systems of the computer system 102, it will be appreciated that these operations need not necessarily be performed by the specific components identified, and could be performed by a variety of components and modules and potentially distributed over a number of machines.

The method 400 commences at operation 402, and at operation 404, time-variant data is retrieved by the visualization application 104 from a data source. For example, the visualization application 104 may retrieve time-variant data, via the data interface 106, from the data store 110, from a remote data store 112 by the network 111, or directly from a real time remote data feed 114. In one example embodiment, the time-variant data retrieved from the data store 110 is initially captured, processed and written to the data store 110 by the data capture module 108, prior to the retrieval operation 404 by the visualization application 104. While the time-variant data may relate to any number of different types of data items, the example embodiment as described below will be discussed in the context of time-variant data relating to stocks, with a portfolio of stocks providing an example of multiple data items. Accordingly, in the example embodiment, the retrieval of the time-variant data from multiple data items may include the retrieval, from the data store 110, of stock prices for multiple stocks captured at multiple points in time.

At operation 406, the baseline module 204 determines a base value for each of the multiple stocks. The base value may, in an example embodiment, be selected at the closing price of the stock at a determinable time instance (e.g., at closing of a particular stock exchange on a previous day). However, in other embodiments, the base value may be calculated based on the time-variant data retrieved at operation 404. For example, the base value may be the average price of a particular stock over a determinable time period (e.g., the average price, high price, or low price of a particular stock over the past week, set month, year or some other time period).

At operation 408, the deviation module 206 may then determine a deviation value (e.g., as a percentile or relative value change) for each of the stocks, again based on the time-variant data. A deviation value may, in one example embodiment, be calculated as the percentile change from the base value relative to a stock price value at some other determinable time (e.g., a current time, or some other identified past time). For example, where the base value for a stock is selected as being the closing price of the previous day, the deviation value may be calculated by determining a current stock price, and calculating the deviation value as the percentage change between the current price and the closing price on the previous day. In other embodiments, the deviation value may again involve a calculation of a second value to be compared to the base value. This second value may be calculated as the average price, high price, or a low price over another period of time. In one example, the base value may be the average price of the stock in one year, and the deviation value may be generated using the average price for the stock over another year as the second value. In any event, it will be appreciated that in order to generate a deviation value, a base value and a comparison value for each of multiple data items (e.g., stocks) are determined, and are then used to calculate a relative change or deviation value representing a deviation between the base value and the comparison value. A wide variety of values may be determined and/or calculated as either the base value or the comparison value.

At operation 410, the graph module 202 then proceeds to generate a display of a segmented graph that includes dividers defining multiple graph segments. Each graph segment is dedicated to a specific data item of the multiple data items (e.g., to a specific stock of a portfolio of stocks). As mentioned, the graph module 202 may be capable of generating any one of a number of graph types, such as polar area graph or a bar graph using the polar graph functionality 212 or the bar graph functionality 214, respectively. Examples of each of these graphs are discussed elsewhere herein with reference to subsequent user interface diagrams.

At operation 412, the baseline module 204 generates a display of a common baseline value indication, representative of the base values of the multiple data items. The common baseline value indication is displayed, within the context of the segmented graph, so as to provide a common base reference across each of the segments. Where the segmented graph is a bar graph, the common baseline value indication may be a simple straight line which traverses the segments, parallel to one of the axis of the bar chart. Where the segmented graph is a polar area graph, the baseline value indication may comprise a circle at a predetermined radius from the center of the polar graph.

At operation 414, the deviation module 206 may generate a display of deviation indications, representative of the deviation values calculated at operation 408, for each of the multiple data items. The deviation indications are displayed within the context of the segmented graph, and relative to the common baseline indication, so as to provide a visual depiction of the deviation value. The display of the deviation indication for each data item may include scaling the display of the various deviation indications to provide a meaningful display. The display of the deviation indications may also include visually characterizing and enhancing the deviation indications so as to provide additional information regarding the deviations and so as to enable a user to assess a meaning and nature of the deviation at a glance. The method 400 then terminates at operation 416.

Figure 5:
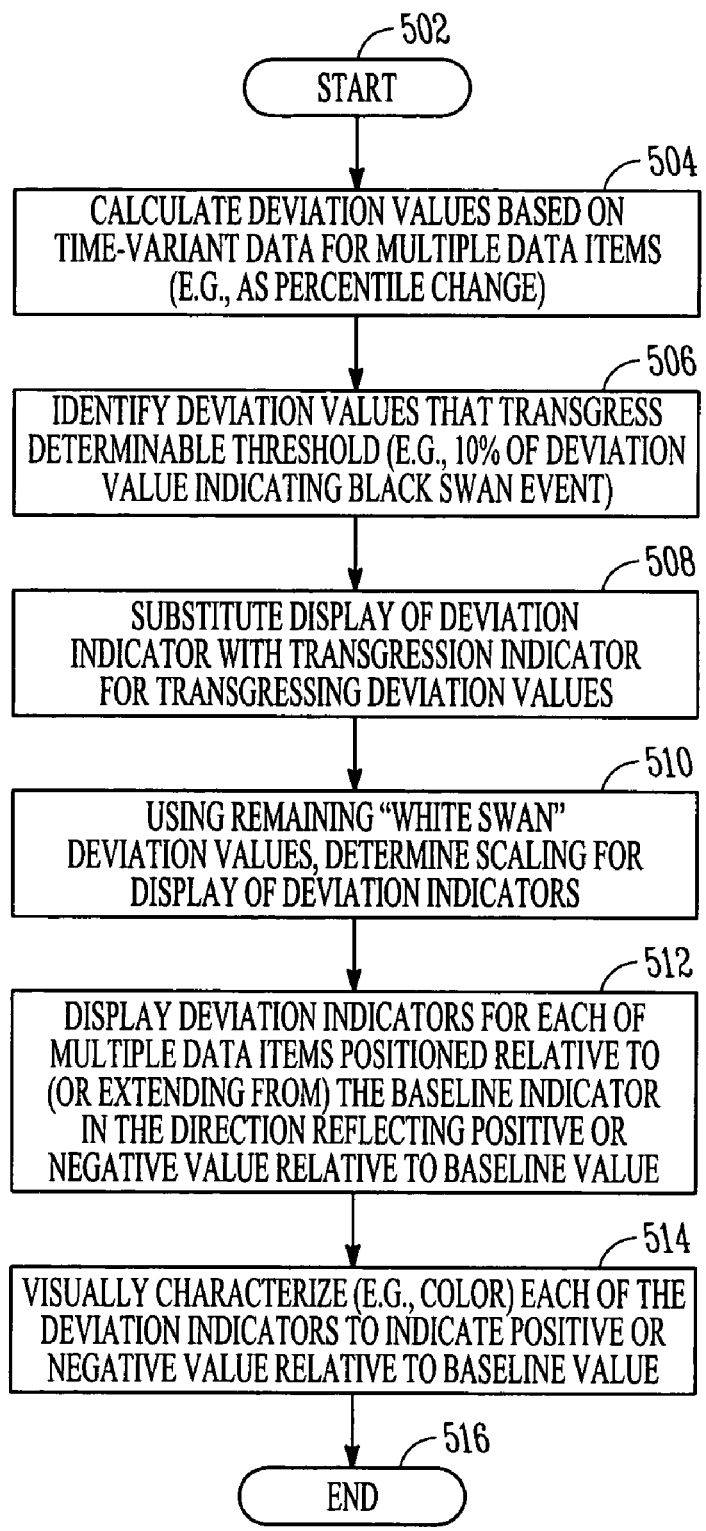
FIG. 5 is a flowchart illustrating further specifics of an operation, according to an example embodiment, to display deviation indications, based on respective deviation values, for each of multiple data items.

FIG. 5 is a flowchart illustrating further details regarding the operation of determining deviation values and generating a display of deviation indications, as may be performed at operations 410 and 414 in the method 400. The operations commence at operation 502. At operation 504, the deviation module 206, using a base value and a comparison value for each of multiple data items, may calculate a respective deviation value as a percentile change. At operation 506, the threshold module 208 may identify deviation values that transgress a determinable threshold. For example, where the data items are stocks, the threshold module 208 may identify deviation values that constitute a "Black Swan." Consider that, where the base value for a stock is determined to be the closing price of the stock on the previous day, and the comparison value is determined to be a current price of the stock, example stocks may reflect the following deviation values: ADBE +15%, MS −10%, AAPL +1%, and Bloomberg −90%. In this example, the stock Bloomberg may be regarded as having experienced a "Black Swan" deviation. The determinable threshold may, in one example, be a user specifiable, and may, in another example, be predetermined and stored by the threshold module 208 (e.g., +−10%)

At operation 508, the threshold module 208 may operate with the deviation module 206 to substitute or replace the display of a deviation indication, within a segment for the relevant data item, with a transgression indication for transgressing deviation values. In the above example, within a segment of the segmented graph generated by the graph module 202, a transgression indication may be provided as opposed to a deviation indication, which will be displayed for the "White Swan" deviation values (i.e., deviation values that do not transgress the determinable threshold).

At operation 510, the deviation module 206, using the remaining "White Swan" deviation values, determines a scaling for the display of the deviation indicators. The scaling of the display for the deviation indicators may include determining a peak-to-peak deviation between the multiple deviation values for the portfolio of stocks. Again, given the above example, the Bloomberg stock is excluded from the peak-to-peak determination, and a maximum peak-to-peak deviation is observed to exist between the ADBE stock and the MS stock (e.g., a 25% peak-to-peak deviation). This calculated maximum peak-to-peak deviation may be used to scale the display of the deviation indications within the context of the segmented graph so as to allow for maximum utilization of the graph area. The calculation of the maximum peak-to-peak deviation across the data items may also be used by the baseline module 204 to determine placement of the baseline value indication within the context of the segmented graph. Again, considering the example where there is a 25% peak-to-peak maximum deviation, the baseline value indication may be positioned so as to accommodate display of the −10% deviation indication for the MS stock, and also to accommodate the +15% deviation indication for the ADBE stock.

The scaling for the display of the deviation indications at operation 510 accordingly takes into account that a 25% "spread" needs to be displayed to accommodate the maximum and minimum deviation values, and the scaling for both the graph and the deviation indications may be calculated accordingly.

At operation 512, the deviation module 206 proceeds to generate displays of deviation indications for each of the multiple data items positioned relative to, or extending from, the baseline indicator within the context of the segmented graph. The deviation indicators are positioned relative to, or shown to extend from, the baseline indicator at a location or in a direction reflecting either a positive or negative value relative to the baseline value.

At operation 514, the deviation indicators may be visually characterized (e.g., colored) to enhance the communication of a positive or negative value of the deviation value relative to baseline value. The operations then terminate at operation 516.

Figure 6:
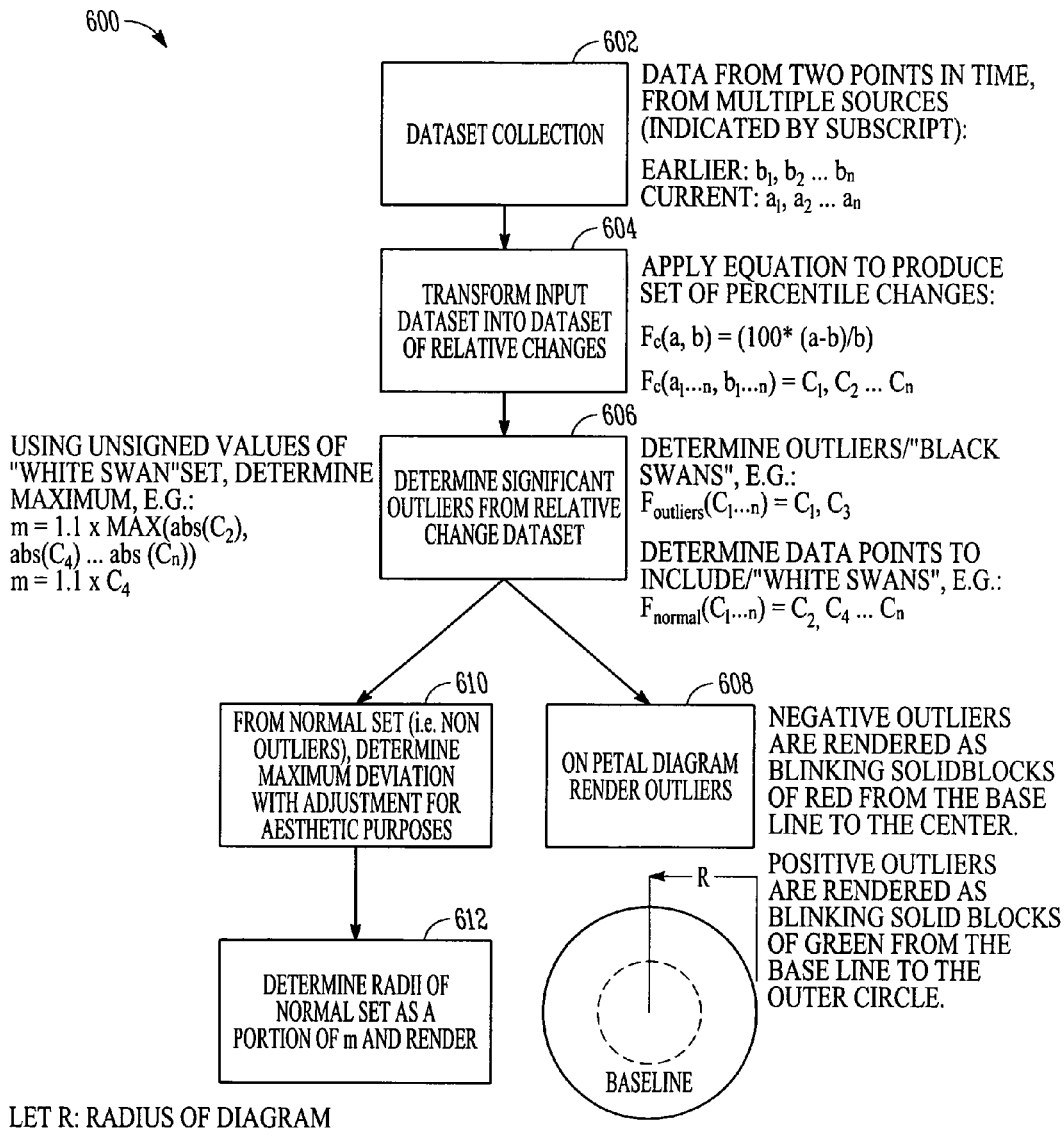
FIG. 6 is a flowchart illustrating a method, according to an example embodiment, to display a polar area graph including deviation indications.

FIG. 6 is a flowchart illustrating a method 600, according to an example embodiment, to generate a display of time-variant information within a context of a polar area (or petal) graph. The method 600 commences at operation 602, with a dataset collection. The time-variant dataset collection may involve, for example, collecting data (e.g. values) from multiple points in time and from multiple sources for a set of data items (e.g., a portfolio of stocks).

At operation 604, the time-variant dataset is transformed into a dataset of relative changes. For example, the deviation module 206 may apply an equation to produce a set of percentile changes based on the collected time-variant dataset.

At operation 606, the threshold module 208 may identify significant outliers from the relative change dataset. As described above, this may involve determining whether any values within the relative change dataset exceed either positive or negative thresholds. Accordingly, the threshold module 208 may, at operation 606, generate two sets of relative change values, namely a first set of "outlier" deviation values and a second set of "normal" deviation values.

At operation 608, the deviation module 206 may generate a display of a transgression indication for each of the deviation values in the outlier dataset. In one example embodiment, the negative outliers may be rendered, within the context of the segmented graph and within a segment for the relevant stock, as solid blocks of red that extend from the baseline to a center point of the polar area graph. Positive outliers, on the other hand, may be rendered as blinking solid blocks of green that extend from the baseline to an outer circle of the polar area graph.

At operation 610, for the "normal" dataset of relative change values, the scaling function 216 of the deviation module 206 determines a maximum peak-to-peak deviation amongst the data items of the "normal dataset." The display of the graph, baseline and deviation indications may then be scaled or otherwise adjusted by the deviation module 206 based on this maximum peak-to-peak deviation, as described above, for aesthetic purposes.

At operation 612, the deviation module 206 may, for each of the relative change values within the "normal" set of relative change values, determine a radius, as a proportion of the radius of the diagram, at which to display a circle segment (or other marker) within an appropriate segment. Further, at operation 612, the deviation module 206 may render the deviation indications within the segments. For example, if the relative change value is negative, then the deviation module 206 may render a circle segment, within the appropriate graph segment, towards the center of the polar area graph, relative to the baseline, and may render the area within the segment between the baseline and the circle segment in red, with red being indicative of the negative value. On the other hand, if the relative change value is positive, the deviation module 206 renders a circle segment (or other marker) between the baseline indication and an outer circle of the polar area graph, and renders a segment area between the baseline and the circle segment in green, with green being indicative of a positive deviation value.

Figure 7:
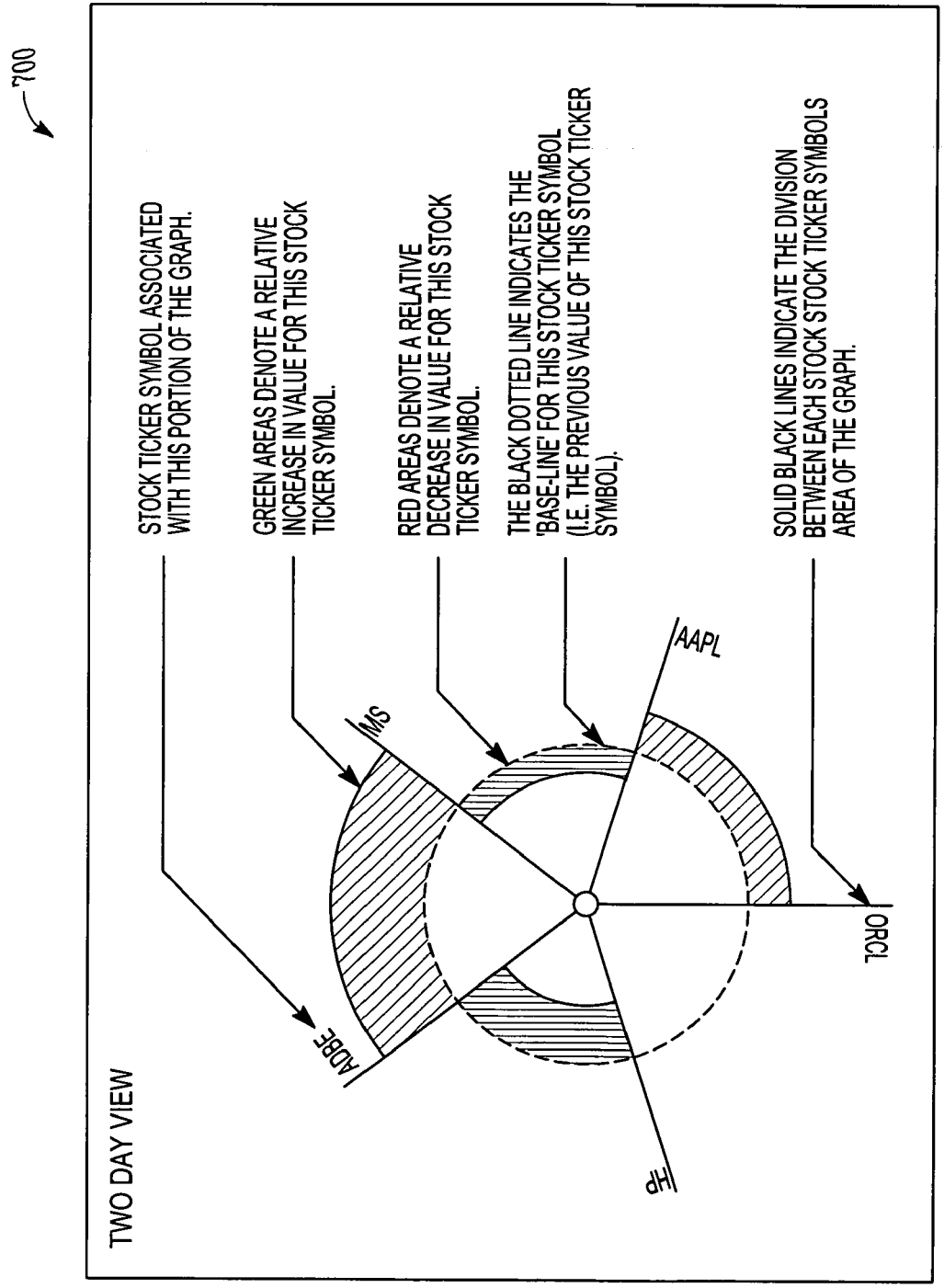
FIGS. 7-24 illustrate user interfaces, according to various example embodiments, that display time-variant information.

FIG. 7 is a user interface diagram, illustrating a radial summation view interface 700, according to an example embodiment, that may be generated by the visualization application 200. The radial summation view includes an example polar area graph having a number of dividers extending radially from a center point to define multiple segments, each of the segments being dedicated to a particular data item (e.g., a stock). The dividers of the polar area graph, in this example, define segments of an equal angle or size. The radial summation view shown within a radial summation view interface 700 furthermore provides a comparative two-day snapshot (e.g., today versus yesterday) of the health of a user's stock portfolio. The radial summation view includes a baseline value indication in the form of the white dotted line that provides a visual representation of the previous value of the stock for a particular symbol. It will be noted that the baseline value indication is common across each of the segments of the polar area graph, and is thus common to each of the data items (e.g., stocks). This is useful as it provides a common reference point against which the relative performance of each of the stocks may be displayed. In this way, a meaningful comparison of the performance of the relevant stocks may be depicted.

Each of the segments of the polar area graph is furthermore shown to include a marker in the form of a circle segment indicating the value of the relevant stock at a further time instance (e.g., a current time). The area between the baseline and the circle segment within each graph segment may be visually characterized (e.g., colored) to denote either a relative increase in a value for the stock or a relative decrease in the value of the stock. For example, for the ADBE stock, the area between the dotted baseline and the circle segment is colored green to denote a relative increase in the value of the stock. On the other hand, the area between the dotted baseline and a circle segment in the MS segment is colored red to denote a decrease in the value for the stock.

It should be noted that for the radial summation view shown in the radial summation view interface 700, the deviation scale for all stocks is equivalent, but the peak-to-peak scale (e.g., for example, −5% to +5% or −10% to +10%) is derived from the maximum peak-to-peak deviations (barring "Black Swan" deviations) of the represented portfolio. A Black Swan may be an eccentric change outside a predetermined threshold (e.g., +−10% of a market trend). In an example embodiment, a positive Black Swan may be represented by an entire slice or segment of a polar area graph being colored green and shown to be blinking, while a negative Black Swan may be represented by entire slice being colored red and also blinking.

Figure 8:
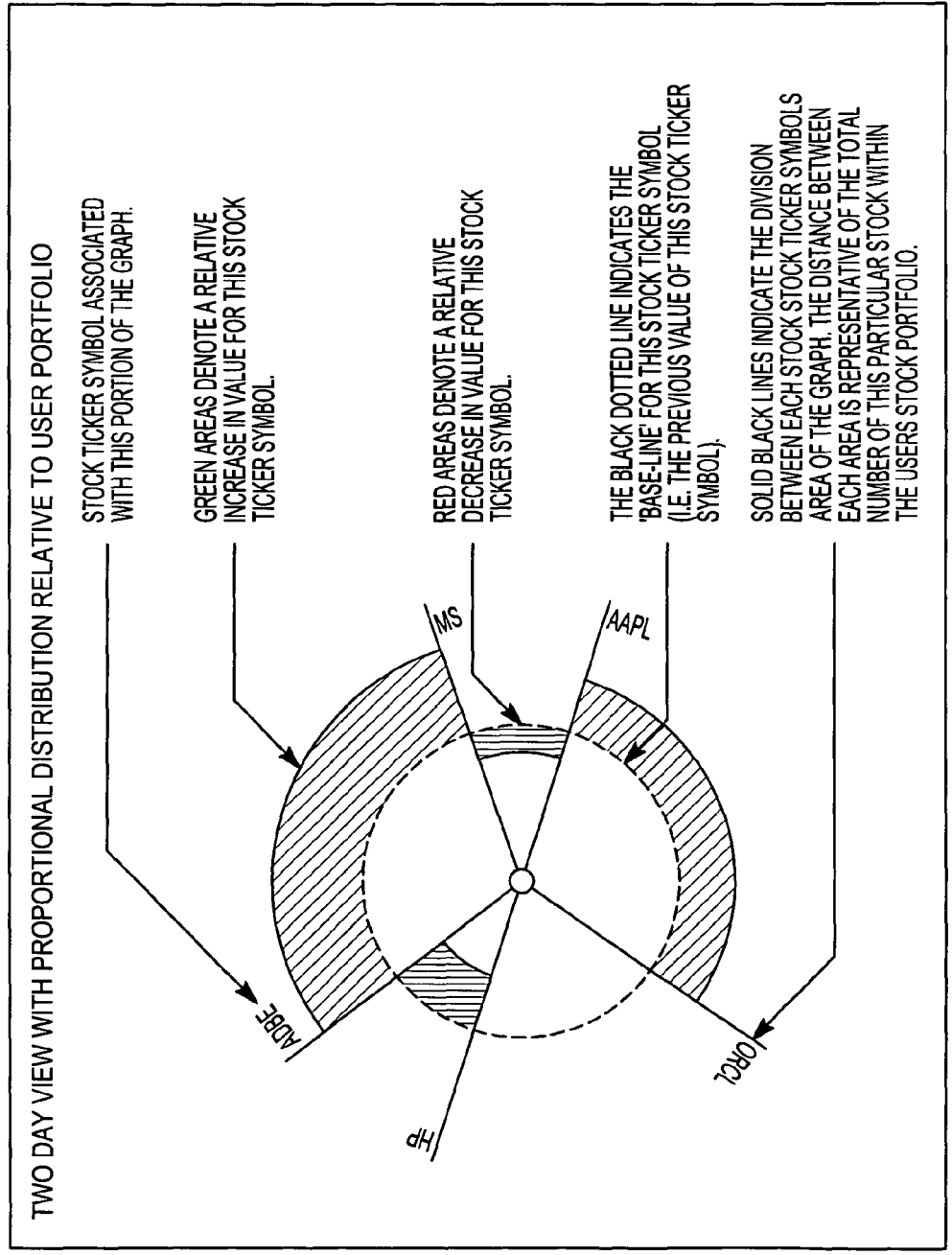

FIG. 8 is a user interface diagram illustrating a further example embodiment of a radial area summation view interface 800, according to an example embodiment, with a proportional distribution relative to a user's portfolio. In the radial area summation view interface 800, the angle of a portfolio segment or "slice" within the polar area graph is related to a percentage of the stock within the user's total portfolio. For example, if a user has 180 ADBE shares, 120 MS shares, and 60 Google shares, the slices or segments of the polar area graph attributed with these shares may occupy 180°, 120° and 60° respectively. This augmentation permits users to determine, at a glance, the overall health of their portfolio by obtaining a visual impression of the amount of area within the graph that is colored red as opposed to green. In other words, in order to generate the radial area summation view interface 800, the graph and deviation modules 202 and 206 may operate to size the display of the segments of a segmented graph according to quantity values for first and second data items respectively.

Figure 9:
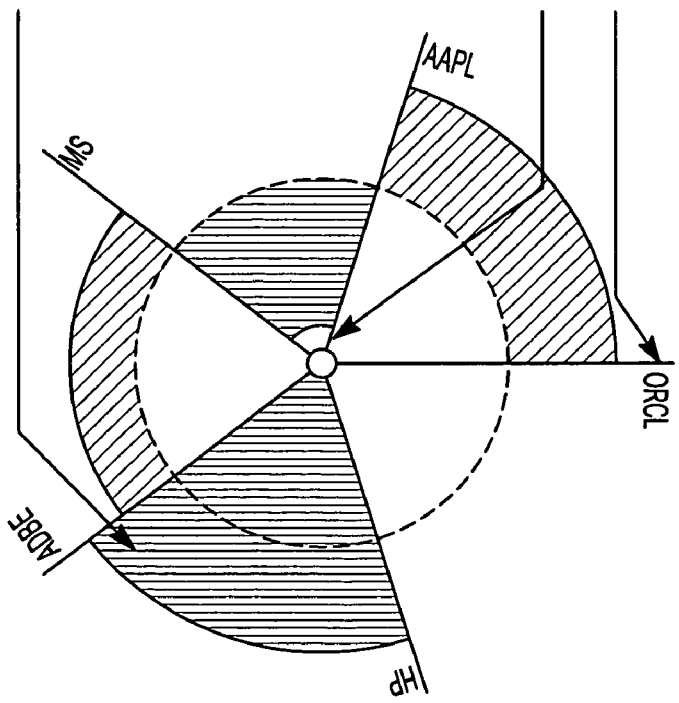

FIG. 9 is a user interface diagram illustrating a further example embodiment of a radial summation view interface 900, in which the radial summation view indicates a "Black Swan" event. As illustrated, the portion or segment of the polar area graph given to a particular stock suffering a "Black Swan" event is displayed as entirely red or green, depending on the nature of the "Black Swan" event. An urgent nature of such a change in value may furthermore be reinforced through animation or other visual clues (e.g. flashing color within the filled portion of the visualization iconography, etc.). FIG. 9 also illustrates that, in the example polar area graph, the visual representation of the relative value (e.g., the deviation value) for a particular stock which is increased or decreased, but does not transgress a "Black Swan" threshold, does not occupy the entire segment, as will be appreciated from the equations illustrated with reference to operations 606 and 612 in FIG. 6. The border of the inner and outermost edges of any stocks symbol ring may be used exclusively for "Black Swan" events.

Figure 10:
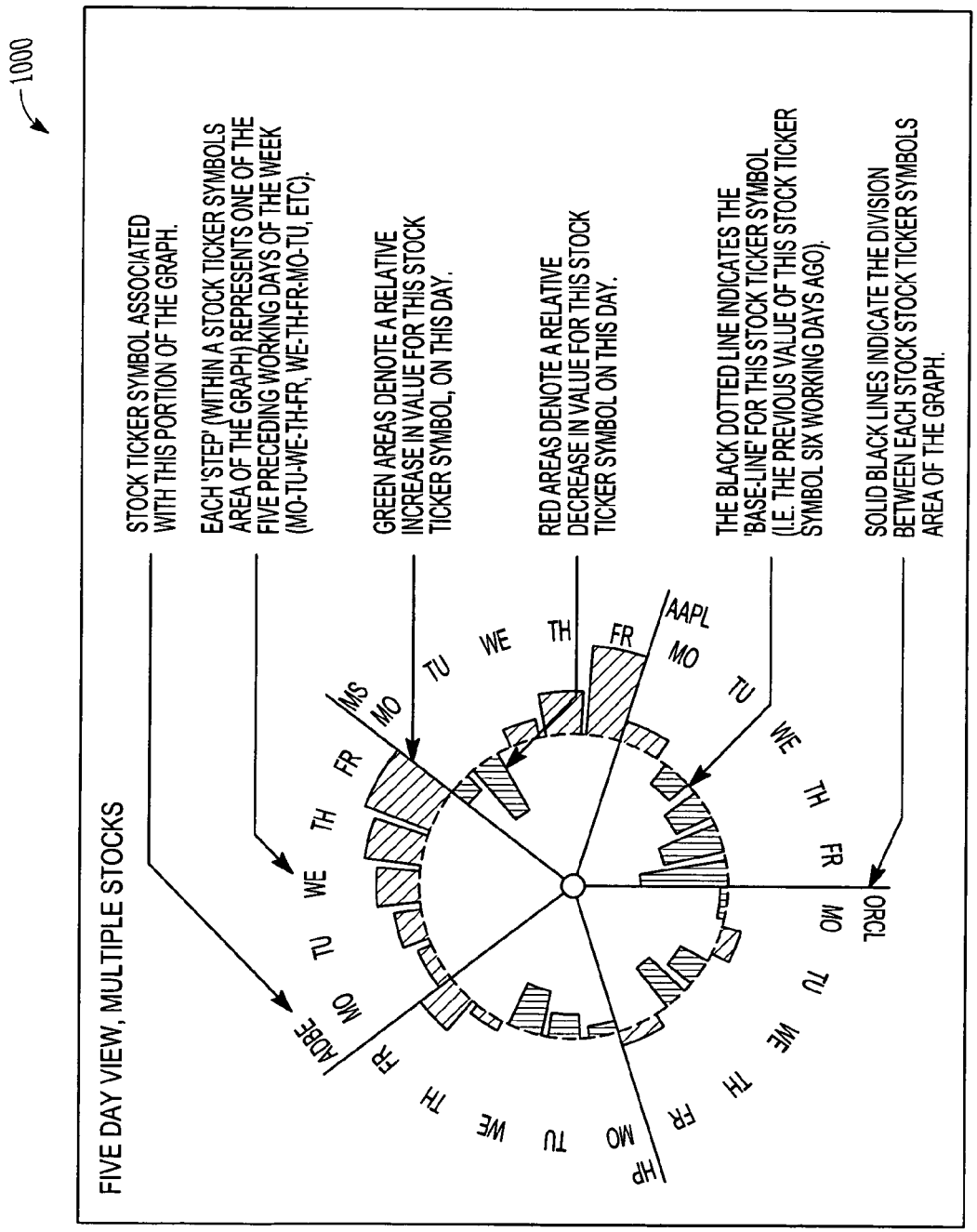
Figure 11:
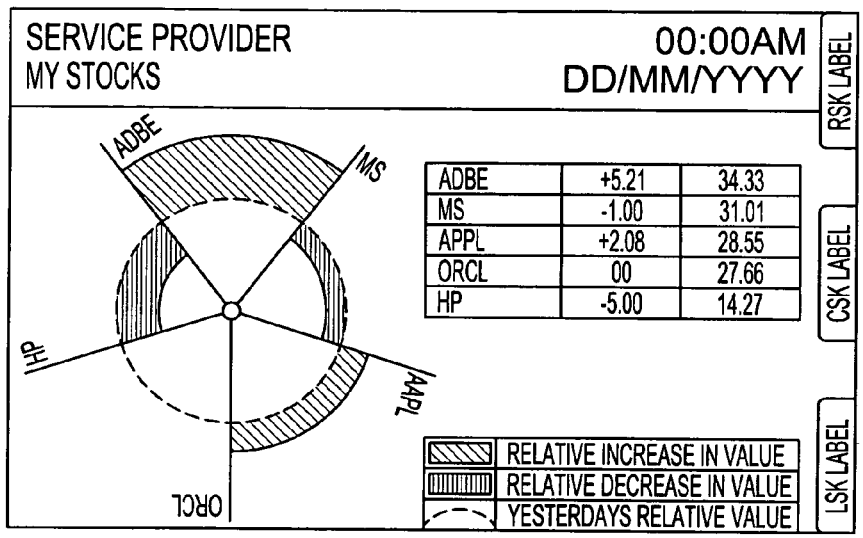
Figure 12:
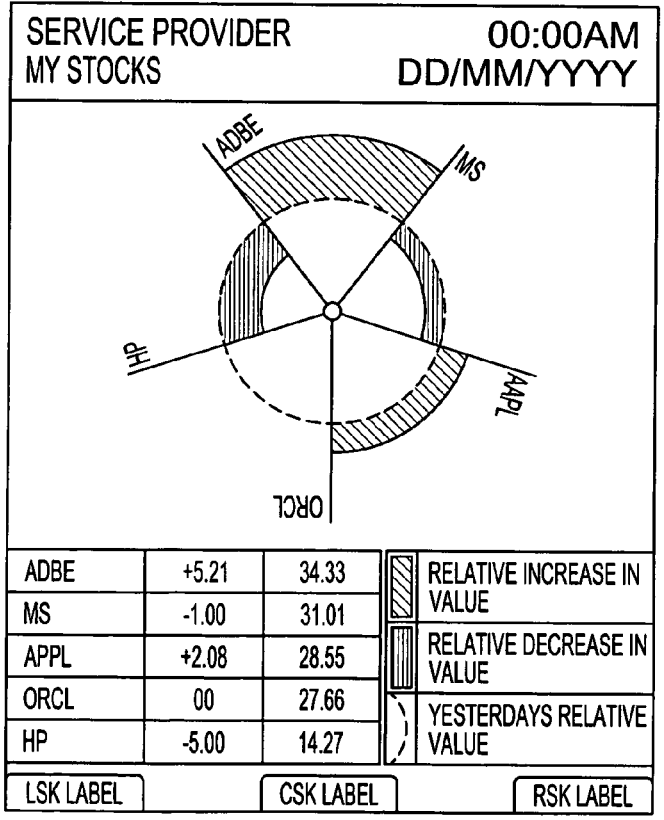
Figure 13:
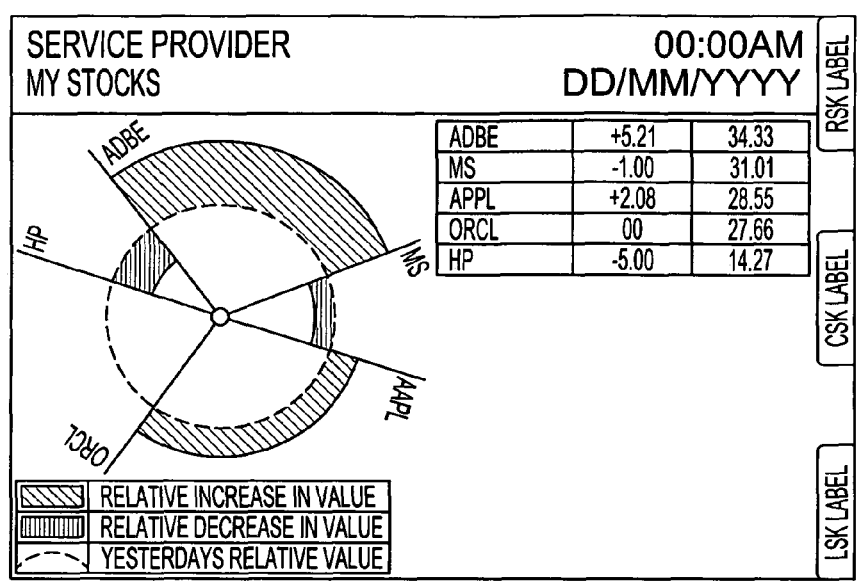
Figure 14:
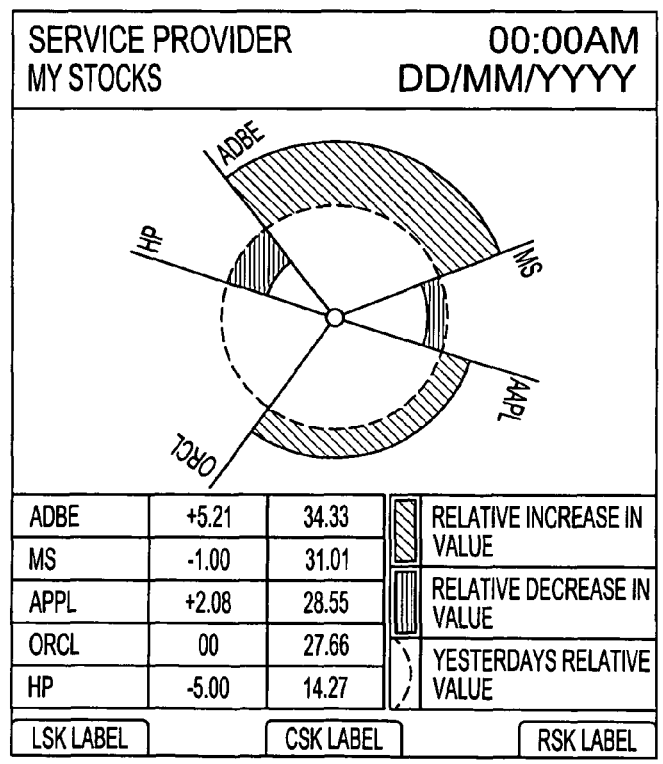
Figure 15:
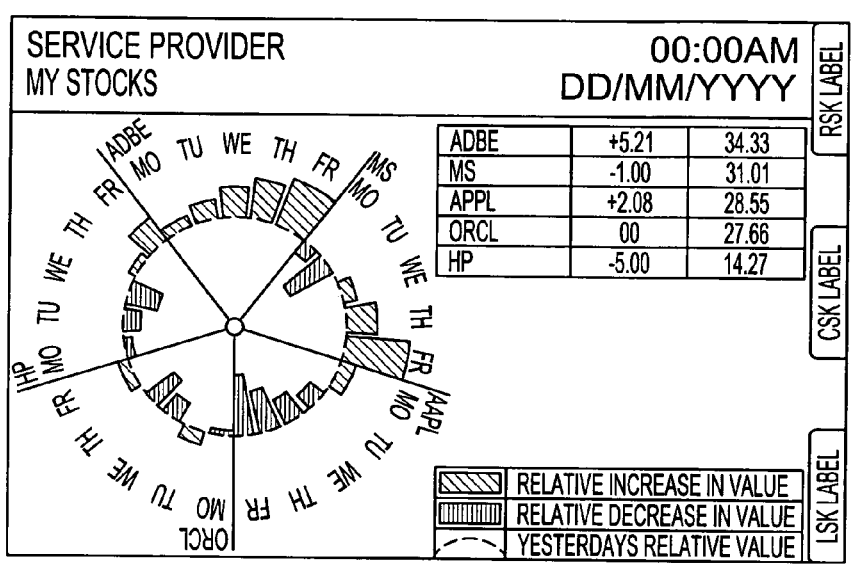
Figure 16:
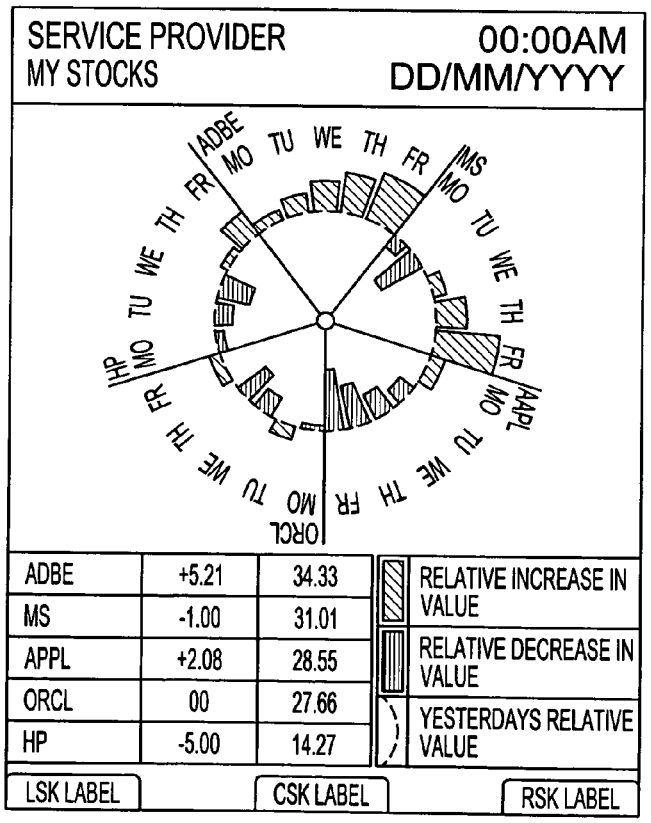

FIG. 10 is a user interface diagram illustrating an example radial area chronological view interface 1000, according to an example embodiment. The chronological view displayed within the chronological view interface 1000 is characterized by a display, within each segment of the polar area graph, of a number of deviation indicators. Each of the deviation indicators represents a respective deviation value at a different determinable time or time interval. Specifically, in the example chronological view, angular "tranches" are rendered and displayed within each slice. Each tranche compares a particular date with a previous day. Accordingly, in the example view, the ADBE share is seen to be increasing day on day at an increasing rate (e.g., each relative jump from the previous day is larger than that of the day before it).

FIGS. 11-16 are user interface diagrams illustrating radial view interfaces 1100-1600, according to example embodiments, wherein a polar area graph is displayed in conjunction with other information pertinent to the stocks represented in the polar area graph. Both landscape and portrait view user interfaces are represented in these examples.

Figure 17:
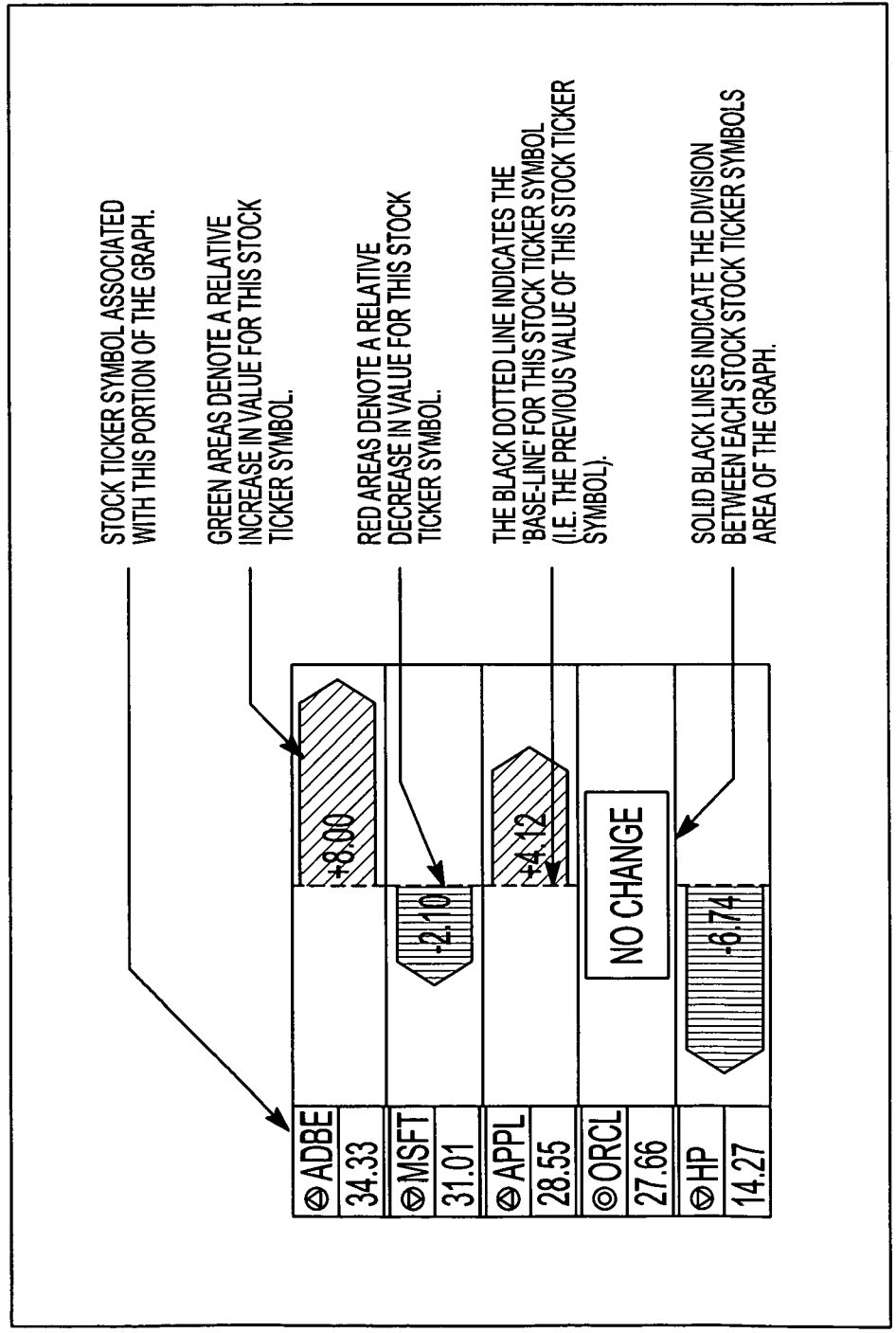
Figure 18:
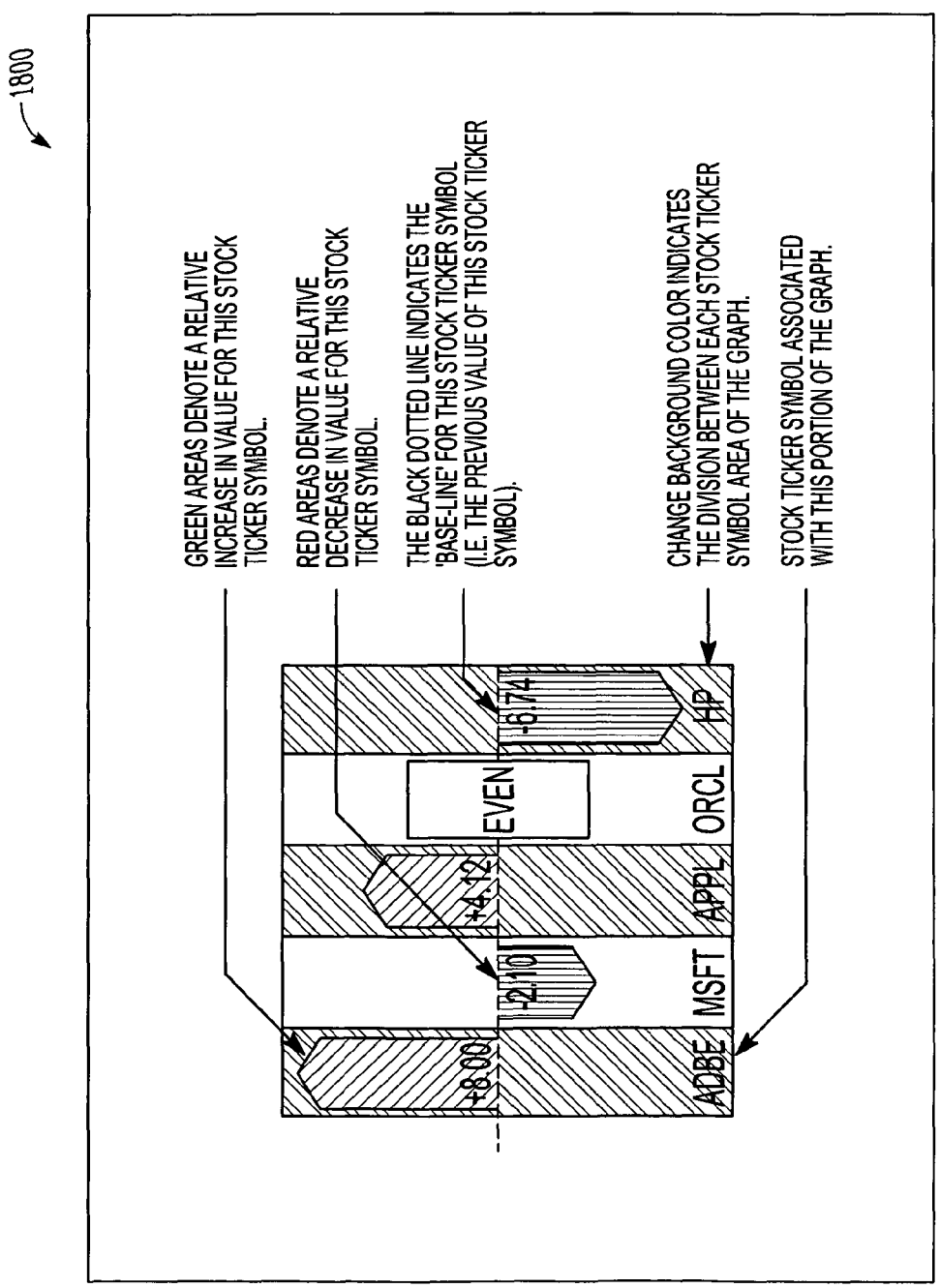
Figure 19:
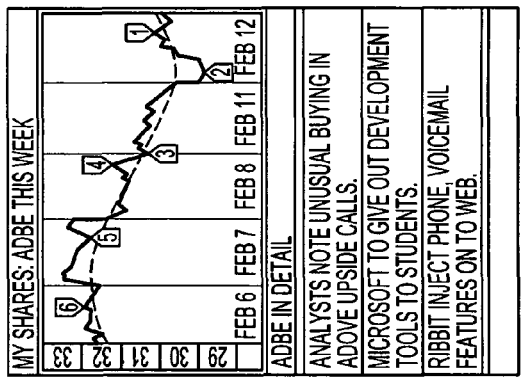
Figure 20:
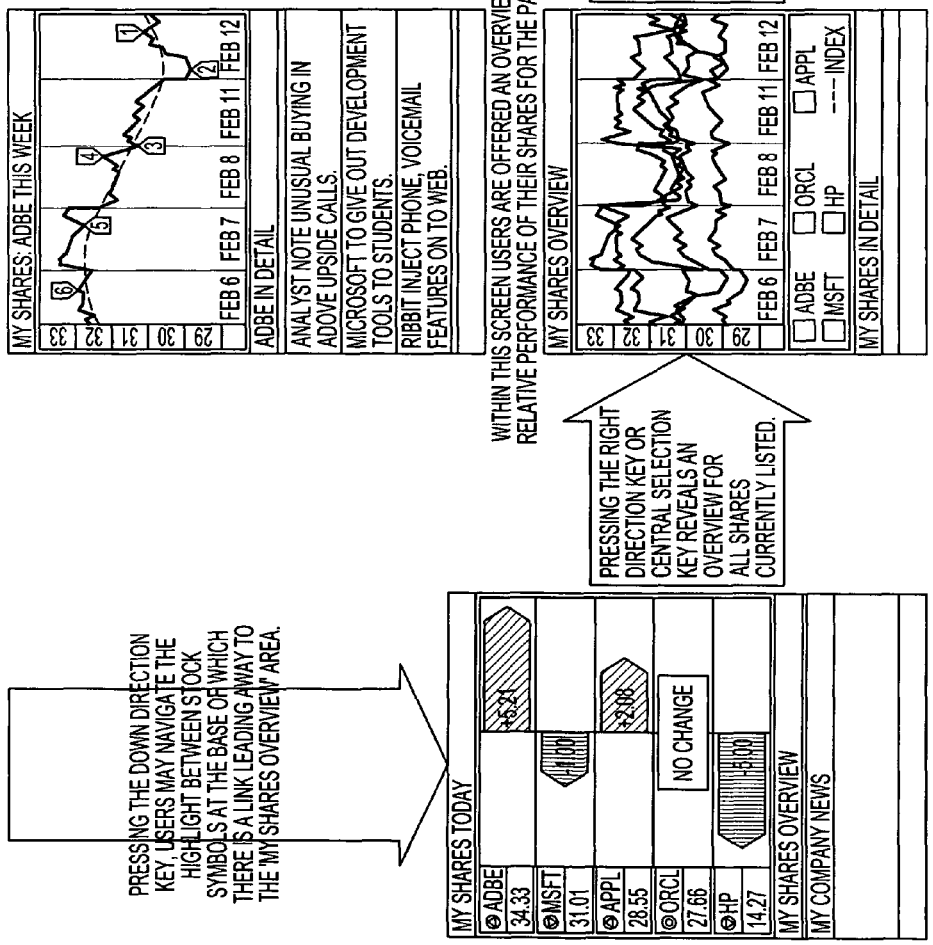
Figure 21:
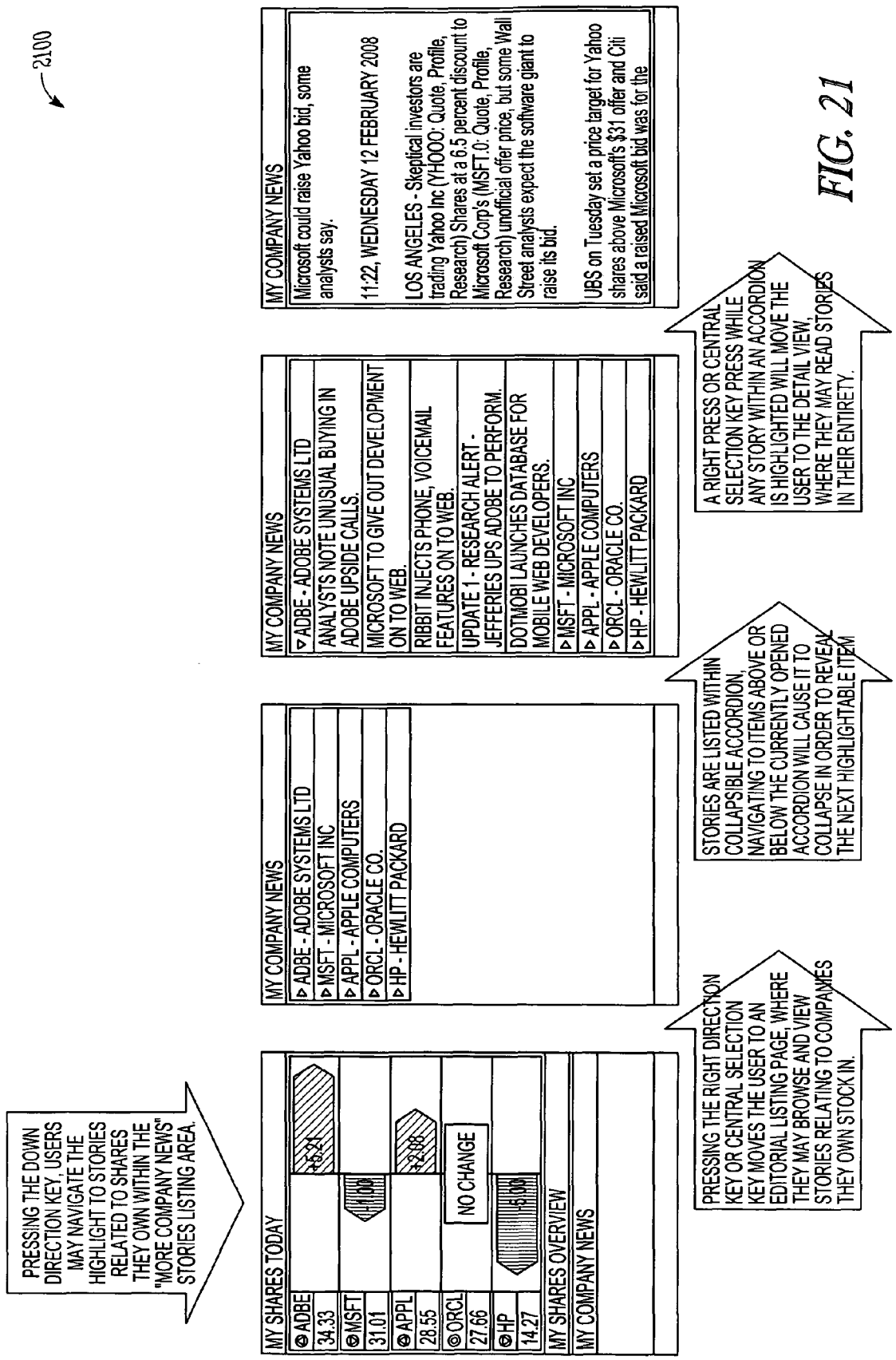
Figure 22:
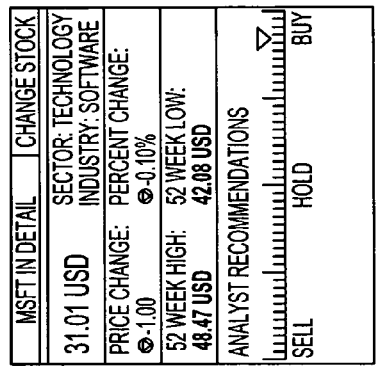
Figure 22:
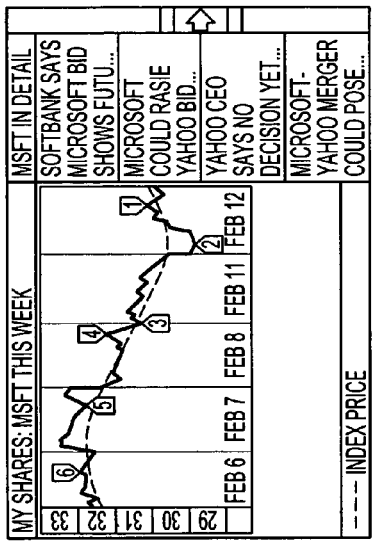
Figure 22:
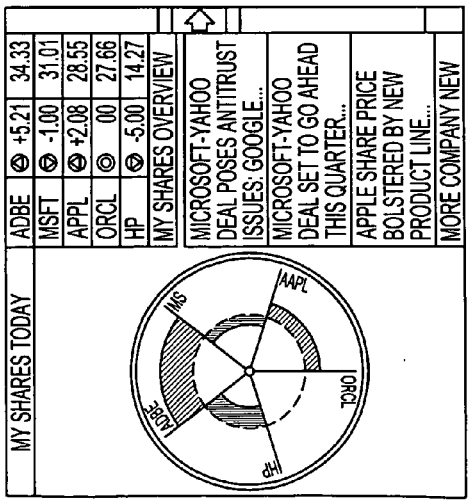
Figure 23:
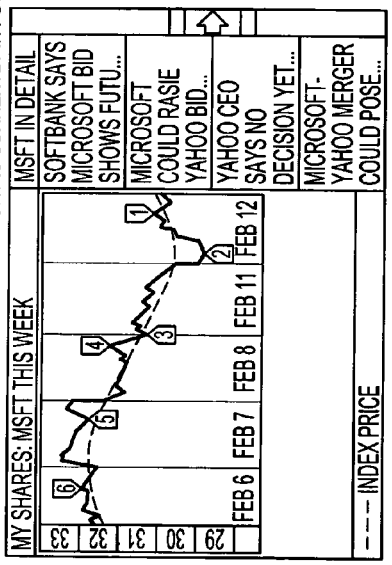
Figure 23:
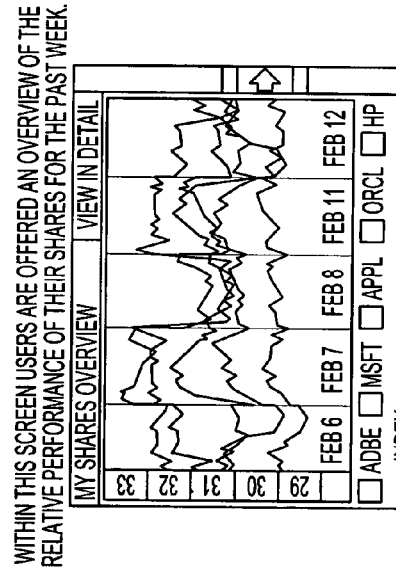
Figure 23:
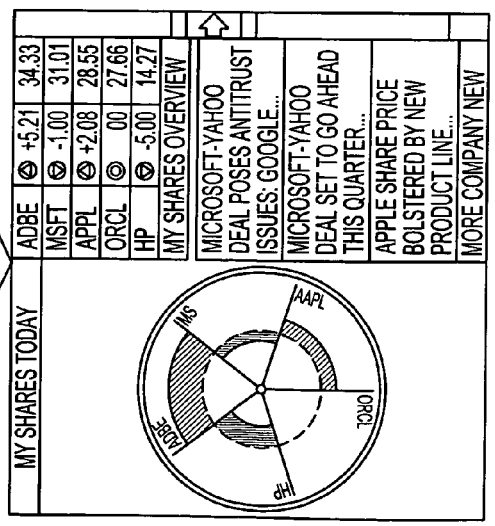
Figure 24:
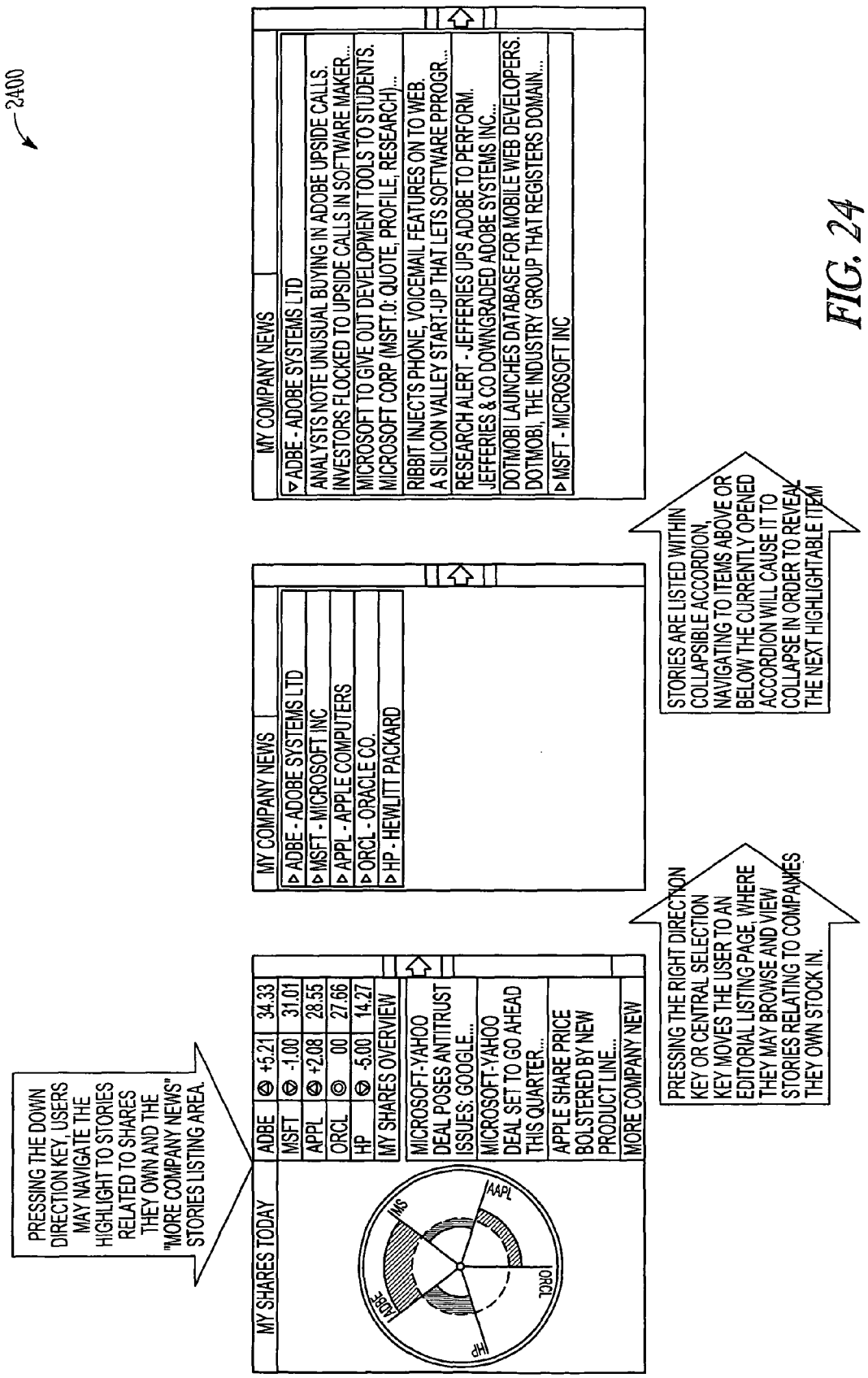

FIG. 17 is a user interface diagram illustrating an example bar summation view interface 1700. In this example embodiment, the baseline value indication is a straight line that traverses segments of a bar graph that are defined by parallel dividers that segment the graph. As shown, the baseline value indication extends at a 90° angle to the segment dividers of the bar graph. As with the radial bar graphs illustrated in the preceding drawings, each segment of the graph is dedicated to a specific data item (e.g., a stock), and a deviation or relative value indication is shown to extend from the baseline value indication. In this example, the extent of the "bar" for each of the segments within the relevant segment is determined by the underlying deviation value. Of course, in other embodiments, the deviation indication may comprise simply a solid line or other marker positioned within one of the "segments" or "tracks" of the bar chart, and the intervening area between the baseline value indication and such a deviation indication may or may not be colored or otherwise visually distinguished. However, in one embodiment, the area between the outermost deviation indication and the common baseline value indication may again be colored to provide additional information to a user. While the bar summation view of the interface 1800 is shown to have a horizontal orientation, a bar summation view of an example bar summation view interface 1800 shown in FIG. 18 has a vertical orientation.

FIGS. 19-24 show various user interface flows 1900-2400 that may be associated with the summation views discussed in the preceding figures.

Modules, Components and Logic

Certain embodiments are described herein as including logic or a number of components, modules, or mechanisms. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiples of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communications with input or output devices and can operate on a resource (e.g., a collection of information).

Electronic Apparatus and System

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
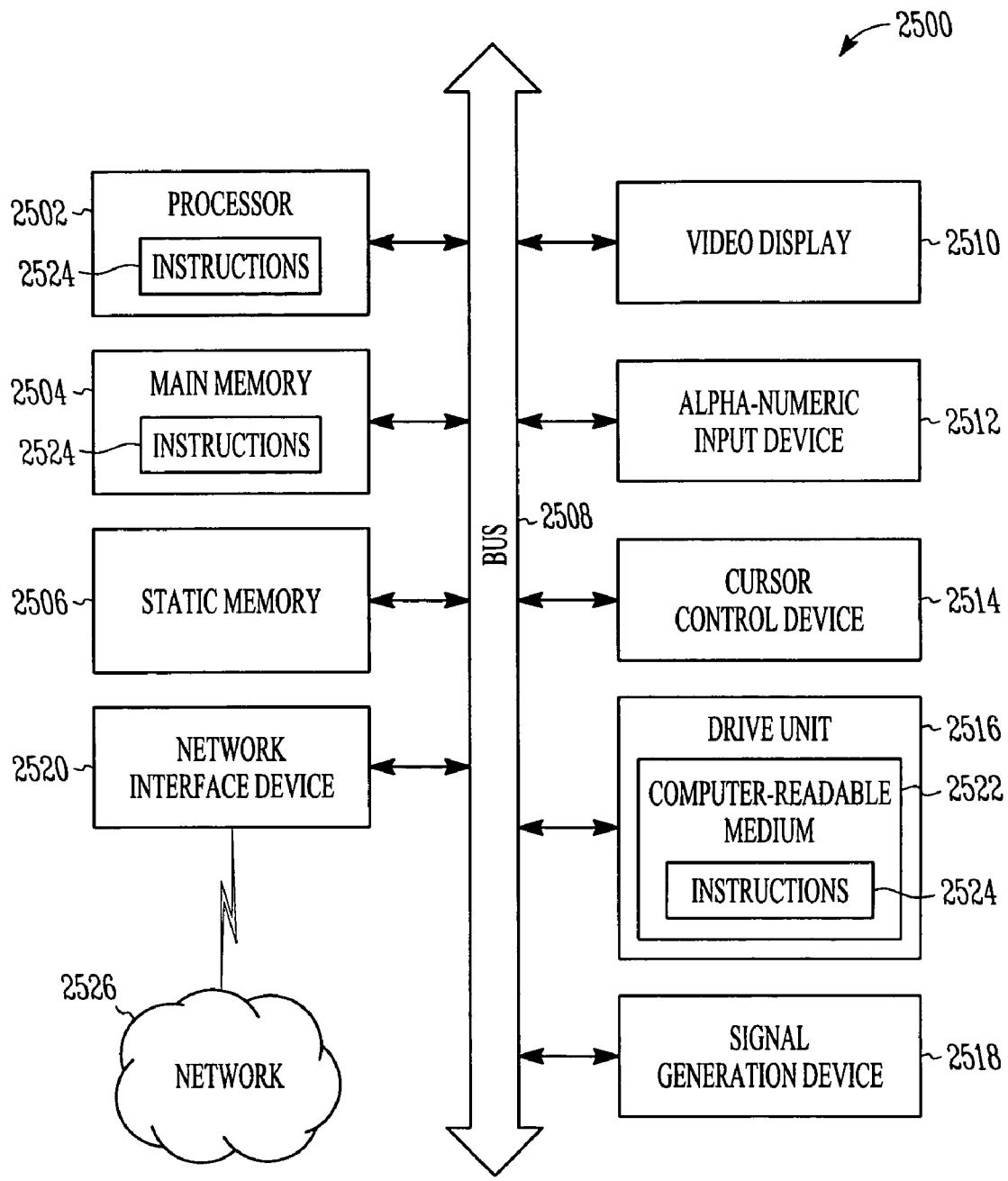
FIG. 25 is a block diagram of a machine in the example form of a computer system within which set instructions for causing the machine to perform any one or more of the methodologies discussed herein may be executed.

FIG. 25 is a block diagram of a machine in the example form of a computer system 2500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2504, which communicate with each other via a bus 2508. The computer system 2500 may further include a video display unit 2510 (e.g., a LCD or a cathode ray tube (CRT)). The computer system 2500 also includes an alphanumeric input device 2512 (e.g., a keyboard), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software 2524) embodying or used by any one or more of the methodologies or functions described herein. The software 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies described herein, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 2524 may further be transmitted or received over a communications network 2526 using a transmission medium. The software 2524 may be transmitted using the network interface device 2520 and any one of a number of well-known transfer protocols (e.g., HTTP). Examples of communication networks include a local area network (LAN), WAN, the Internet, mobile telephone networks (e.g., GPRS, EDGE, UMTS and HSDPA), Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier and/or to a backend, or storage tier. The processing performed by the logic tier may relate to certain rules or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer system as various components.

Components

Example embodiments may include the above described tiers, and processes or operations about constituting these tiers may be implemented as components. Common to many of these components is the ability to generate, use, and manipulate data. These components, and the functionality associated with each, may form part of standalone, client, server, or peer computer systems. The various components may be implemented by a computer system on an as-needed basis. These components may include software written in an object-oriented computer language such that a component oriented or object-oriented programming technique can be implemented using Flash Lite, Flash, AIR, FLEX, Python, a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in Flash may be able to communicate with another component written in the Python programming language through using a RESTful, XML-RPC, a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data A System of Transmission Between a Server and Client Example embodiments may use the OSI model or TCP/IP protocol stack model for defining the protocols used by a network to transmit data. In applying these models, a system of data transmission between a server and client, or between peer computer systems, may, for example, include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to display temporally variant information, the method comprising:

using at least one computer processor, generating a display of a common baseline value indication for first and second data items, the common baseline value indication representing respective first and second base values for the first and second data items as a first time instance; and generating a display of first and second deviation indicators, relative to the common baseline value indication, for each of the first and second data items, the first and second deviation indicators:

representing respective first and second deviation values, relative to the respective first and second base values, for the first and second data items at a second time instance;

visually identifying each of the respective first and second deviation values as being at least one of positive or negative relative to the respective first and second base values: and generating a display of a segmented graph, the first deviation indicator being displayed within a first segment of the segmented graph and the second deviation indicator being displayed within a second segment of the segmented graph, and displaying the common baseline value indication with respect to each of the first and second segments of the segmented graph, wherein the first and second segments of the segmented graph are sized according to first and second quantity values for the first and second data items respectively.

2. The method of claim 1, wherein first and second data items are first and second stocks respectively, and the first and second quantity values are first and second numbers of stock holdings for the first and second stocks, respectively.

3. The method of claim 1, including, within the first segment of the segmented graph, displaying a plurality of first deviation indicators for the first data item, each of the plurality of deviation indicators representing a respective deviation of value, relative to an associated base value, at a different determinable time.

4. The method of claim 3, wherein the first and second data items are first and second stocks respectively, and wherein each of the plurality of deviation indicators represents a respective deviation in a value of the first stock on a particular day relative to a value of the first stock on a preceding day.

5. The method of claim 1, wherein the segmented graph is a polar area graph, and wherein the displaying of the common baseline value indication includes displaying a baseline circle at a radius from a center point of the polar area graph, the baseline circle extending across the first and second segments of the segmented graph.

6. The method of claim 5, wherein the display of the first and second deviation indicators includes displaying respective first and second circle segments at respective first and second radii from the center point of the polar area graph, the first and second radii being calculated based on the respective first and second deviation values.

7. The method of claim 6, wherein the displaying of the first and second deviation indicators includes visually characterizing an area on the polar area graph between the baseline circle and the first circle segment to indicate the first deviation value as being either positive or negative relative to the first base value.

8. The method of claim 1, wherein the visual identification of the respective deviation values as being at least one of positive or negative includes displaying the first and second deviation indicators as extending in either a first direction or a second direction from the common baseline value indication.

9. The method of claim 1, wherein the visual identification of the respective deviation values as being at least one of positive or negative includes visually characterizing the first or second deviation indicators to indicate the respective first and second deviation values as being either positive or negative relative to the respective first and second base values.

10. The method of claim 1, including scaling the display of the first and second deviation indicators, relative to the common baseline value indication, based on a maximum peak-to-peak deviation between the respective first and second deviation values.

11. The method of claim 10, including determining that the first deviation value transgresses a predetermined threshold, and selectively excluding the first deviation value from a determination of the maximum peak to peak deviation based on the determination that the first deviation of value transgresses the predetermined threshold.

12. The method of claim 10, including determining that the first deviation value transgresses a predetermined threshold, and selectively substituting the display of the first deviation indicator with a first transgression indicator based on the determination that the first deviation value transgresses the predetermined threshold.

13. The method claim 1, including determining the respective first and second deviation values for the first and second data items as percentage deviations relative to the respective first and second base values.

14. A system to display temporally variant information, the system comprising:
at least one computer processor configured to execute
a baseline module to display, on a computer-generated user interface, a common baseline value indication for first and second data items, the common baseline value indication representing respective first and second base values for the first and second data items as a first time instance;
a deviation module to display first and second deviation indicators, relative to the common baseline value indication, for each of the first and second data items, the first and second deviation indicators:
representing respective first and second deviation values, relative to the respective first and second base values, for the first and second data items at a second time instance; and
visually identifying each of the respective first and second deviation values as being at least one of positive or negative relative to the respective first and second base values; and
a graph module to display a segmented graph, the first deviation indicator being displayed within a first segment of the segmented graph and the second deviation indicator being displayed within a second segment of the segmented graph, and displaying the common baseline value indication with respect to each of the first and second segments of the segmented graph;
wherein the first and second segments of the segmented graph are sized according to first and second quantity values for the first and second data, items respectively.

15. The system of claim 14, wherein first and second data items are first and second stocks respectively, and the first and second quantity values are first and second numbers of stock holdings for the first and second stocks, respectively.

16. The system of claim 14, wherein the deviation module is to display, within the first segment of the segmented graph, a plurality of first deviation indicators for the first data item, each of the plurality of deviation indicators representing a respective deviation of value, relative to an associated base value, at a different determinable time.

17. The system of claim 14, wherein the first and second data items are first and second stocks respectively, and wherein each of the plurality of deviation indicators represents a respective deviation in a value of the first stock on a particular day relative to a value of the first stock on a preceding day.

18. The system of claim 14, wherein the graph module is to display the segmented graph as a polar area graph, and wherein the baseline module is to display a baseline circle at a radius from a center point of the polar area graph, the baseline circle extending across the first and second segments of the segmented graph.

19. The system of claim 18, wherein the deviation module is to display the first and second deviation indicators as respective first and second circle segments at respective first and second radii from the center point of the polar area graph, the first and second radii being calculated based on the respective first and second deviation values.

20. The system of claim 19, wherein the deviation module is to display the first and second deviation indicators by visually characterizing an area on the polar area graph between the baseline circle and the first circle segment to indicate the first deviation value as being either positive or negative relative to the first base value.

21. The system of claim 14, wherein the deviation module is display the first and second deviation indicators as extending in either a first direction or a second direction from the common baseline value indication to indicate the respective first and second deviation values as being either positive or negative relative to the respective first and second base values.

22. The system of claim 14, wherein the deviation module is to visually characterize the first or second deviation indicators to indicate the respective first and second deviation values as being either positive or negative relative to the respective first and second base values.

23. The system of claim 14, wherein the deviation module is to scale the display of the first and second deviation indicators, relative to the common baseline value indication, based on a maximum peak to peak deviation between the respective first and second deviation values.

24. The system of claim 23, including a threshold module to determine that the first deviation value transgresses a predetermined threshold and to selectively exclude the first deviation value from a determination of the maximum peak to peak deviation based on the determination that the first deviation of value transgresses the predetermined threshold.

25. The system of claim 23, including a threshold module to determine that the first deviation value transgresses a predetermined threshold, and wherein the deviation module is to substitute the display of the first deviation indicator with a first transgression indicator based on the determination that the first deviation value transgresses the predetermined threshold.

26. The system claim 14, wherein the deviation module is to determine the respective first and second deviation values for the first and second data items as percentage deviations relative to the respective first and second base values.

27. A tangible machine-readable medium embodying instructions that, when executed by at least one processor, cause the at least one processor to perform a method comprising:

displaying, on a computer-generated user interface, a common baseline value indication for first and second data items, the common baseline value indication representing respective first and second base values for the first and second data items as a first time instance; and displaying first and second deviation indicators, relative to the common baseline value indication, for each of the first and second data items, the first and second deviation indicators:

representing respective first and second deviation values, relative to the respective first and second base values, for the first and second data items at a second time instance;

visually identifying each of the respective first and second deviation values as being at least one of positive or negative relative to the respective first and second base values; and generating a display of a segmented graph, the first deviation indicator being displayed within a first segment of the segmented graph and the second deviation indicator being displayed within a second segment of the segmented graph, and displaying the common baseline value indication with respect to each of the first and second segments of the segment graph, wherein the first and second segments of the segmented graph are sized according to first and second quantity values for the first and second data items respectively.

28. A system comprising:

first means for generating a display of a common baseline value indication for first and second data items, the common baseline value indication representing respective first and second base values for the first and second data items as a first time instance; and second means for generating a display of first and second deviation indicators, relative to the common baseline value indication, for each of the first and second data items, the first and second deviation indicators:

representing respective first and second deviation values, relative to the respective first and second base values, for the first and second data items at a second time instance; and visually identifying each of the respective first and second deviation values as being at least one of positive or negative relative to the respective first and second base values and third means for generating a display of a segmented graph, the first deviation indicator being displayed within a first segment of the segmented graph and the second deviation indicator being displayed within a second segment of the segmented graph, and displaying the common baseline value indication with respect to each of the first and second segments of the segmented graph;

wherein the first and second segments of the segmented graph are sized according to first and second quantity values for the first and second data items respectively.

\* \* \* \* \*